US012123374B2

(12) United States Patent
Galka et al.

(10) Patent No.: US 12,123,374 B2
(45) Date of Patent: Oct. 22, 2024

(54) FUEL SUPPLY DEVICE WITH INJECTOR AND VAPOR MANAGEMENT

(71) Applicant: Walbro LLC, Cass City, MI (US)

(72) Inventors: William E. Galka, Caro, MI (US); Bryan K. Gangler, Unionville, MI (US); Jeffrey C. Hoppe, Cass City, MI (US); Adam M. McGilton, Caro, MI (US); Bradley J. Roche, Millington, MI (US); Albert L. Sayers, Caro, MI (US); David L. Speirs, Cass City, MI (US)

(73) Assignee: Walbro LLC, Cass City, MI (US)

( * ) Notice: Subject to any disclaimer, the term of this patent is extended or adjusted under 35 U.S.C. 154(b) by 0 days.

(21) Appl. No.: 18/431,100

(22) Filed: Feb. 2, 2024

(65) Prior Publication Data

US 2024/0175411 A1 May 30, 2024

Related U.S. Application Data

(63) Continuation of application No. 17/963,025, filed on Oct. 10, 2022, now Pat. No. 11,920,544.

(60) Provisional application No. 63/256,838, filed on Oct. 18, 2021.

(51) Int. Cl.
*F02M 21/02* (2006.01)

(52) U.S. Cl.
CPC .... *F02M 21/0239* (2013.01); *F02M 21/0257* (2013.01); *F02M 21/0281* (2013.01)

(58) Field of Classification Search
CPC ........... F02M 21/0239; F02M 21/0257; F02M 21/0281; F02M 7/12; F02M 7/18; F02M 5/08
See application file for complete search history.

(56) References Cited

U.S. PATENT DOCUMENTS

2020/0124010 A1* 4/2020 Abei .................... F02D 9/1005
2020/0248635 A1* 8/2020 Burns .............. F02M 35/10216
2021/0003099 A1* 1/2021 Burns .................... F02M 7/127

* cited by examiner

*Primary Examiner* — Xiao En Mo
(74) *Attorney, Agent, or Firm* — Reising Ethington P.C.

(57) ABSTRACT

A fuel supply device includes a main body, fuel chamber, fuel supply pipe and a fuel valve. The main body has a main bore with an inlet for air and an outlet through which a fuel and air mixture flows. The fuel chamber retains a supply of fuel. The fuel supply pipe has a passage communicating with the main bore and through which fuel from the fuel chamber flows to the main bore. And the fuel valve has a valve seat, a valve element movable relative to the valve seat between an open position and a closed position, an inlet upstream of the valve seat and is in communication with the fuel chamber, and an outlet downstream of the valve seat. The outlet is coaxially aligned with the passage of the fuel supply pipe and the fuel valve is electrically operated to move the valve element.

20 Claims, 18 Drawing Sheets

FIG. 12
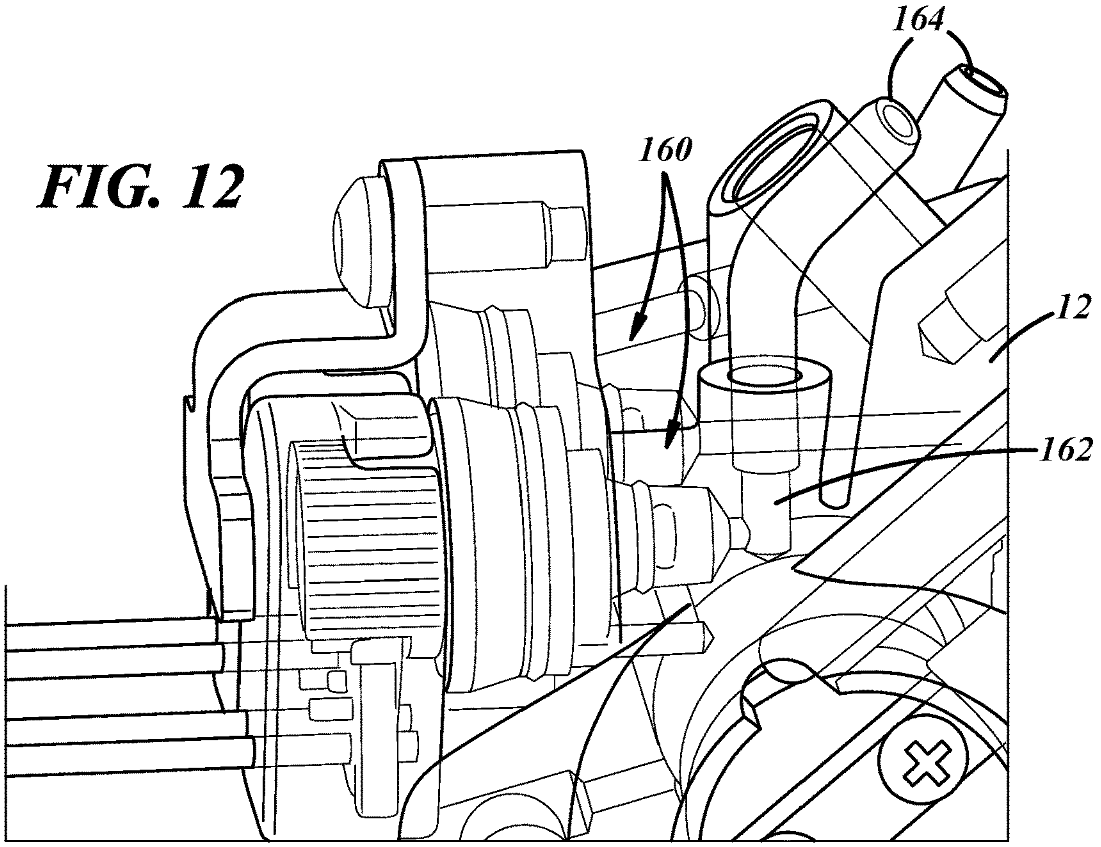
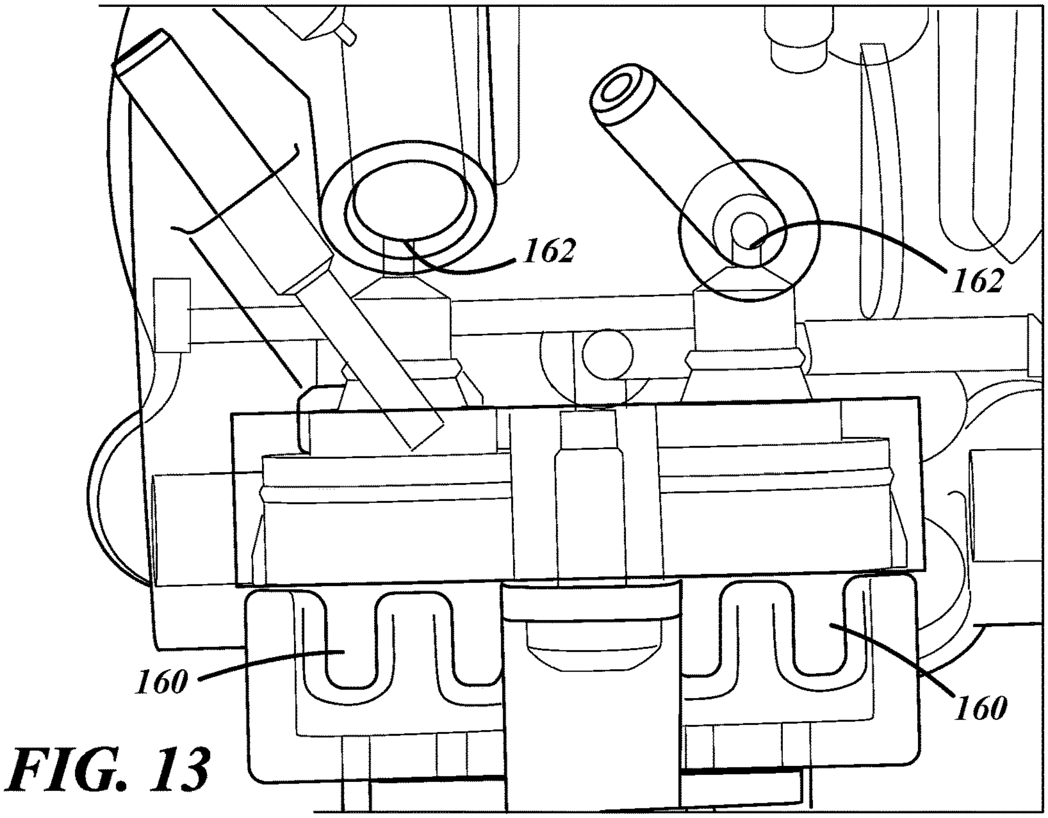
FIG. 13

FUEL SUPPLY DEVICE WITH INJECTOR AND VAPOR MANAGEMENT

REFERENCE TO RELATED APPLICATIONS

This application is a continuation of U.S. patent application Ser. No. 17/963,025 filed Oct. 10, 2022 and claims the benefit of U.S. Provisional Application Ser. No. 63/256,838 filed on Oct. 18, 2021 the entire content of which is incorporated herein by reference in its entirety.

TECHNICAL FIELD

The present disclosure relates generally to a fuel supply device, and more particularly to a fuel supply device having a low pressure fuel supply like a fuel bowl.

BACKGROUND

Fuel systems including electronic fuel injectors typically provide fuel at relatively high pressure to and from the fuel injectors. The injection pressure may be constant so that the duration over which the injector is open determines the amount of fuel discharged from the injector. Such systems may be relatively complex and require multiple sensors some of which may be relatively costly, like oxygen sensors in an exhaust gas, and high pressure pumps to provide fuel to the injectors at the high pressure. Such fuel systems are too expensive and complex for a wide range of engine applications.

SUMMARY

In at least some implementations, a fuel supply device includes a main body, a fuel chamber, a fuel supply pipe and a fuel valve. The main body has a main bore with an inlet through which air flows and an outlet through which a fuel and air mixture flows. The fuel chamber is arranged to receive a supply of fuel. The fuel supply pipe has a passage communicating with the main bore between the inlet and the outlet, and through which fuel from the fuel chamber flows to the main bore. And the fuel valve has a valve seat, a valve element movable relative to the valve seat between an open position and a closed position, an inlet upstream of the valve seat and is in communication with the fuel chamber, and an outlet downstream of the valve seat. The outlet is coaxially aligned with the passage of the fuel supply pipe and the fuel valve is electrically operated to move the valve element.

In at least some implementations, the fuel supply pipe has a first end open to the main bore and a second end opposite to the first end, and the fuel supply pipe extends linearly between the first end and the second end. The fuel chamber may be defined in part by a fuel bowl and the fuel valve may be carried by the fuel bowl.

In at least some implementations, the fuel valve includes a wire coil and an armature, and the valve element is carried by the armature for movement relative to the valve seat. The valve element may have a flat forward face arranged to contact the valve seat, and the valve element may have a thickness between 0.15 mm and 2.0 mm and a hardness between 30 and 90 on the Shore A scale. In at least some implementations, the valve seat extends axially at least 1% of an axial thickness of the valve element. In at least some implementations, the valve element to the closed position at a rate of between 0.2 m/s and 5 m/s. In at least some implementations, the valve seat is tapered or rounded and the valve element initially engages the valve seat with line contact, and the valve element compresses against the valve seat to contact additional area of the valve seat. In at least some implementations, the fuel valve includes a bobbin around which the wire coil is received, the bobbin includes an internal passage in which the armature is received and the internal passage has a diameter that varies along its axial length, and which becomes smaller closer to the valve seat.

In at least some implementations, a vent passage communicates with the fuel chamber, and a vent valve controls fluid flow through the vent passage. The vent valve may be electronically actuated to open and close a valve seat arranged in the vent passage. The vent valve may have a wire coil and an armature movable relative to a vent valve seat to control fluid flow through the vent valve seat. A controller may be connected to the fuel valve and the vent valve to control operation of both the fuel valve and the vent valve. A pressure sensor or a temperature sensor may be communicated with the controller and located to sense a pressure or temperature of a portion of a passage or fuel chamber of the main body. The controller may be carried by the main body.

In at least some implementations, an air bleed passage is provided and a throttle valve is rotatably carried by the main body so that the throttle valve controls fluid flow through the main bore. A shaft of the throttle bore may extend through the air bleed passage and, as the throttle valve is rotated, the shaft varies the flow area of a portion of the air bleed passage to control flow through the air bleed passage.

In at least some implementations, a fuel supply device has a main body with a main bore having an inlet through which air flows and an outlet through which a fuel and air mixture flows, a fuel chamber in which a supply of fuel is received, a vent passage that communicates with the fuel chamber, and a vent valve carried by the main body and arranged to control fluid flow through the vent passage, wherein the vent valve is electronically actuated to open and close a valve seat arranged in the vent passage.

In at least some implementations, a pressure sensor is arranged to sense the pressure within the fuel chamber. The pressure sensor may be carried by a controller assembly mounted to the main body, and the controller assembly may include a controller that operates the vent valve and is communicated with the pressure sensor. In at least some implementations, the controller assembly includes a circuit board on which the controller and the pressure sensor are mounted. In at least some implementations, the controller assembly includes a housing in which the circuit board is received and wherein the housing includes a hollow projection in which at least part of a temperature sensor is received, wherein the hollow projection extends into a passage or cavity of the main body.

In at least some implementations, a throttle valve is rotatably carried by the main body and controls fluid flow through the main bore, and the vent passage includes a first vent passage that opens into the main bore upstream of the throttle valve and a second vent passage that opens into the main bore downstream of the throttle valve.

In at least some implementations, a fuel supply device, includes a main body, a fuel chamber, a vent passage, and a vent valve. The main body has a main bore with an inlet through which air flows and an outlet through which a fuel and air mixture flows. The fuel chamber includes a supply of fuel. The vent passage communicates with the fuel chamber and with a first port through which vapor is vented out of the main body. And the vent valve is carried by the main body, is arranged to control fluid flow through the first port, and the vent valve is electronically actuated to open and close a valve seat arranged in the vent passage.

In at least some implementations, a pressure relief valve is provided that has a valve element and a spring that provides a force on the valve element tending to close the valve element on a valve seat, and the pressure relief valve is communicated with the vent passage and permits a flow of vapor through the pressure relief valve when a pressure acting on the pressure relief valve is greater than a threshold pressure.

In at least some implementations, a second electronically actuated valve is carried by the main body and arranged to permit fluid flow into the fuel supply device through a second port that is spaced from the first port.

In at least some implementations, the vent valve is pulsed between open and closed positions to control a flow rate of vapor through the first port.

In at least some implementations, a controller is communicated with the vent valve to control actuation of the vent valve, and a pressure sensor is arranged to sense the pressure within the fuel chamber, and the controller controls actuation of the vent valve as a function of the pressure within the fuel chamber. In at least some implementations, the vent valve is actuated to provide a controlled rate of depressurization of the fuel chamber. In at least some implementations, the pressure sensor includes a diaphragm or a spring biased plunger that is communicated with the fuel chamber via one or more ports, and the diaphragm or spring biased plunger is moved to close a switch when a threshold pressure exists in the fuel chamber. In at least some implementations, the controller actuates the vent valve when the switch is closed.

In at least some implementations, part of the vent passage is defined by an end of a snorkel tube extending from and coupled to the main body. In at least some implementations, a shroud is provided at the end of the snorkel tube and arranged to reduce pressure fluctuations at the end.

In at least some implementations, a throttle valve has an idle position and a wide open position in which a greater flow rate of air is possible through the main bore than when the throttle valve is in the idle position, and the vent passage is a first vent passage that communicates with the main bore upstream of the throttle valve when the throttle valve is in the idle position, and a second vent passage is provided that communicates with the main bore downstream of the throttle valve when the throttle valve is in the idle position.

In at least some implementations, a fuel supply device includes a main body, a fuel bowl, a column, a fuel supply pipe and a fuel valve. The main body has a main bore with an inlet through which air flows and an outlet through which a fuel and air mixture flows. The fuel bowl is connected to the main body and defines a fuel chamber in which a supply of fuel is received. The column extends into the fuel chamber and defines a bore. The fuel supply pipe is received at least partly in the bore and has a passage communicating with the main bore between the inlet and the outlet, and through which fuel from the fuel chamber flows to the main bore. And the fuel valve is connected to the fuel bowl and has a valve seat, a valve element movable relative to the valve seat between an open position and a closed position, an inlet that is upstream of the valve seat and is in communication with the fuel chamber, and the fuel valve has an outlet that is downstream of the valve seat. The outlet is coaxially aligned with the passage of the fuel supply pipe and the fuel valve is electrically operated to move the valve element.

In at least some implementations, the fuel bowl includes a cavity in which at least part of the fuel valve is received, and a main jet is provided between the fuel valve and the fuel supply pipe, and the main jet includes a restriction having a flow area that is less than the flow area of the passage of the fuel supply pipe. In at least some implementations, the cavity is defined at least in part by a boss of the fuel bowl that extends into the fuel chamber, and wherein one or more inlets are formed in the boss and through which fuel from the fuel chamber can flow to the fuel valve.

In at least some implementations, the fuel valve includes a bobbin having an internal passage and an exterior surface spaced from the internal passage, a wire coil wrapped around the exterior surface of the bobbin, a valve seat defined by the bobbin, an outlet of the fuel valve downstream of the valve seat and defined by the bobbin, and an armature received in the internal passage upstream of the valve seat and the armature is movable relative to the valve seat to selectively permit fluid flow through the valve seat. In at least some implementations, the outlet is coaxially aligned with the passage of the fuel supply pipe. In at least some implementations, the fuel valve is received in a cavity defined at least in part by a boss of the fuel bowl that extends into the fuel chamber, one or more inlets are formed in the boss and through which fuel from the fuel chamber can flow to cavity, and wherein the bobbin includes one or more fluid inlets through which fuel flows from the one or more inlets formed in the boss to the internal passage upstream of the valve seat.

In at least some implementations, a vent passage communicates with the fuel chamber, and a vent valve controls fluid flow through the vent passage, and the vent valve is electronically actuated to open and close a valve seat arranged in the vent passage. In at least some implementations, a controller is connected to the fuel valve and the vent valve to control operation of both the fuel valve and the vent valve. In at least some implementations, a pressure sensor or a temperature sensor is communicated with the controller and located to sense a pressure or temperature of a portion of a passage or fuel chamber of the main body, and one or both of the fuel valve and the vent valve are controlled at least in part based upon the pressure or temperature.

BRIEF DESCRIPTION OF THE DRAWINGS

The following detailed description of certain embodiments and best mode will be set forth with reference to the accompanying drawings, in which:

FIG. 12 is a partial perspective view of the main body showing vent valves and vent passages;

FIG. 13 is a partial side view of the main body showing vent valves and vent passages;

DETAILED DESCRIPTION

Figure 1:
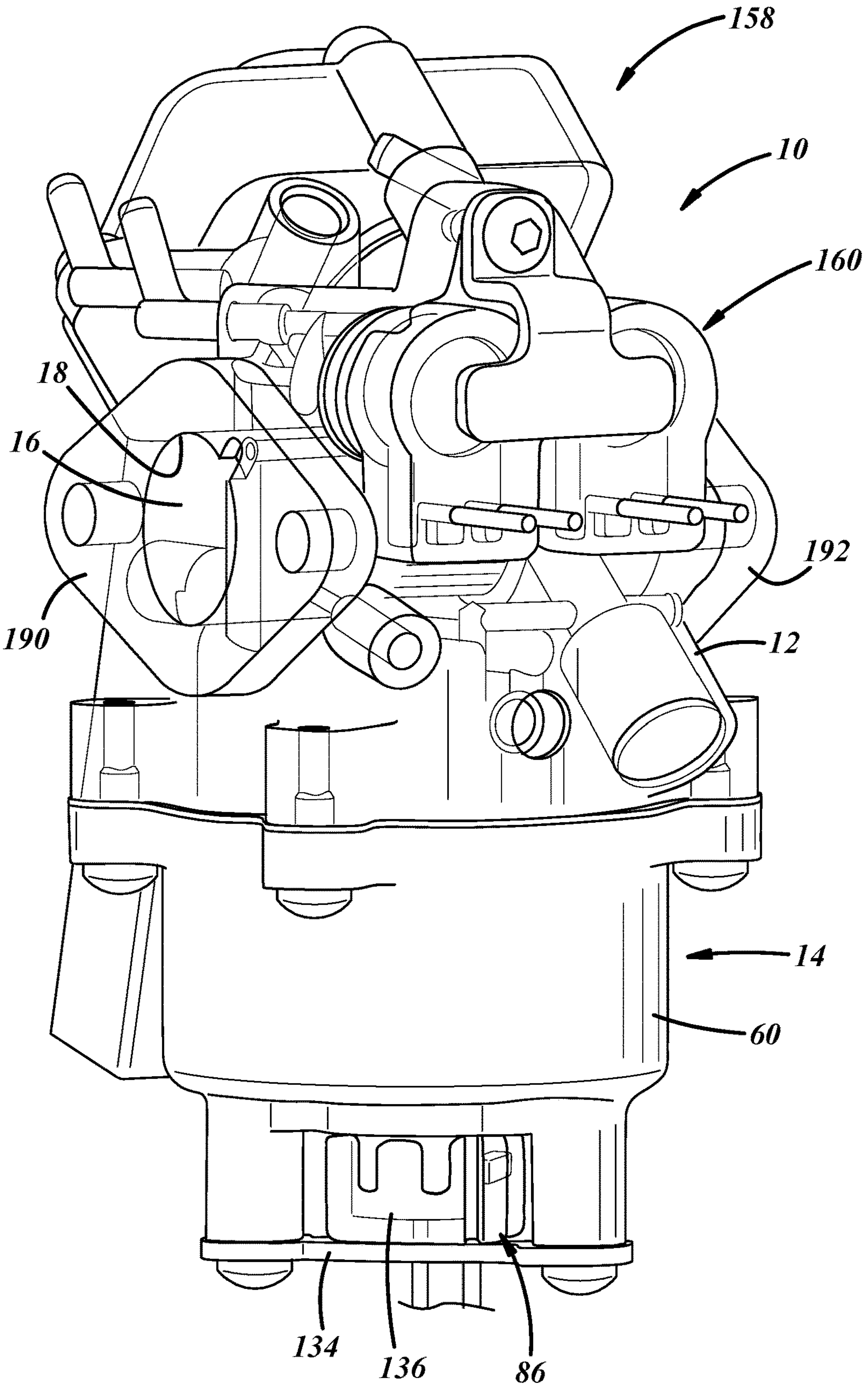
FIG. 1 is a perspective view of a fuel supply device with a main body shown transparent to show internal passages.

Referring in more detail to the drawings, FIG. 1 illustrates a fuel supply device 10, sometimes called a charge forming device, that supplies a fuel and air mixture to an engine. The engine may be a light-duty combustion engine which may include, but is not limited to, all types of combustion engines including two-stroke and four-stroke engines. Light-duty combustion engines may be used with hand-held power tools, lawn and garden equipment, lawnmowers, grass trimmers, edgers, chain saws, snowblowers, personal watercraft, boats, snowmobiles, motorcycles, all-terrain-vehicles, etc.

Figure 2:
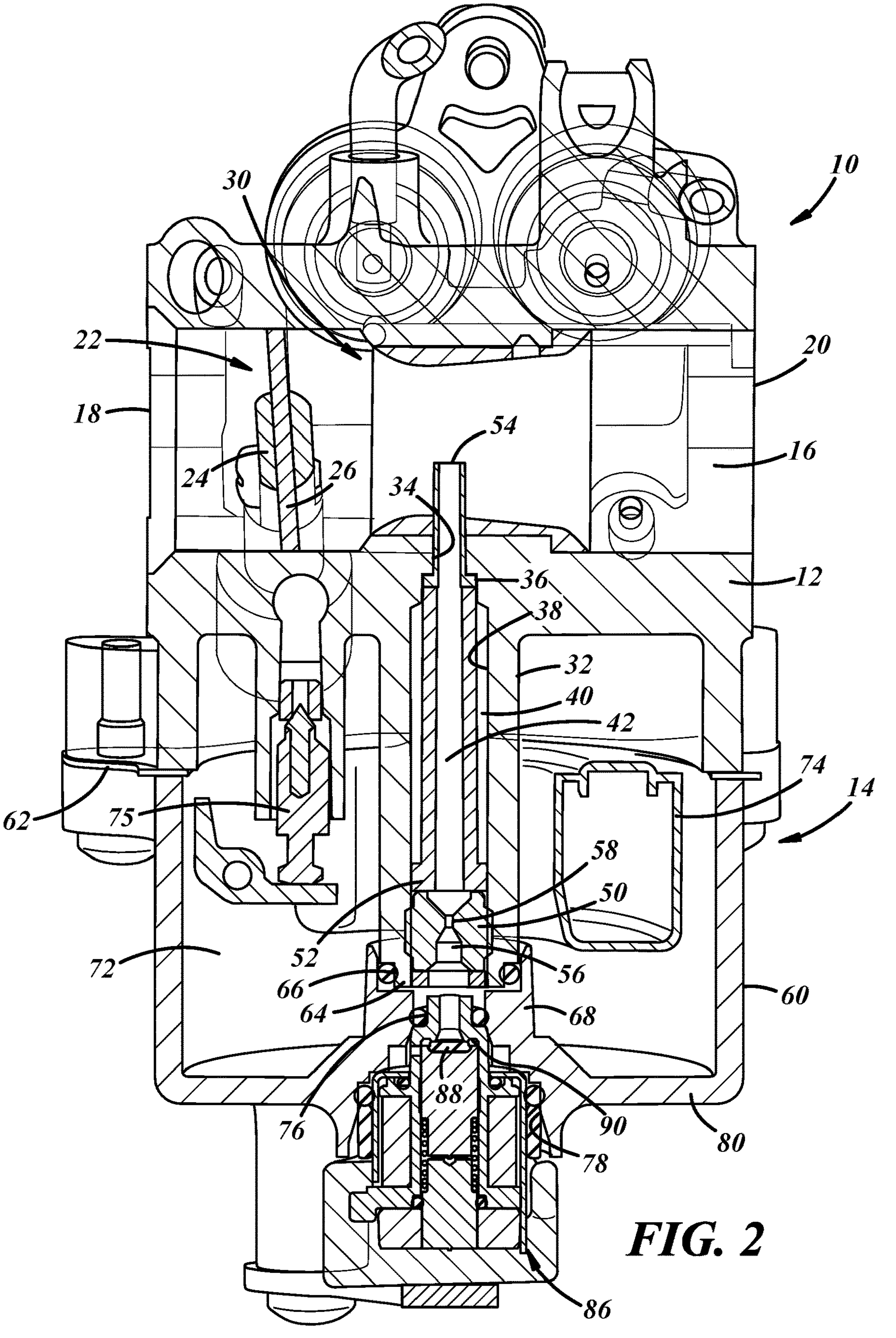
FIG. 2 is a sectional view of the fuel supply device.

In the example shown in FIGS. 1 and 2, the fuel supply device is a carburetor 10. While the carburetor 10 may be of any desired type, including (but not limited to) diaphragm carburetors, rotary valve carburetors and float bowl carburetors, the examples shown in the drawings, are float bowl carburetors. The carburetor 10 includes a main body 12 and a float bowl assembly 14 carried by the main body 12.

The main body has a main bore 16, sometimes called a fuel and air mixing passage, and the main bore 16 has an inlet 18 through which air enters the main body 16 and an outlet 20 through which a fuel and air mixture exits the main body 16 for delivery to the engine. A throttle valve 22 may be carried by the main body 16 and includes a throttle valve shaft 24 that is rotatably supported in a shaft bore 25 (FIGS. 3 and 4) that extends through the main bore 16, and a throttle valve head 26 that is secured to the throttle valve shaft 24 and located in the main bore 16. The main bore 16 may include a venturi 30 or reduced diameter section that serves to alter the fluid flow rate through the main bore 16 and provide a pressure drop to aid in fuel flow into the main bore 16.

Figure 3:
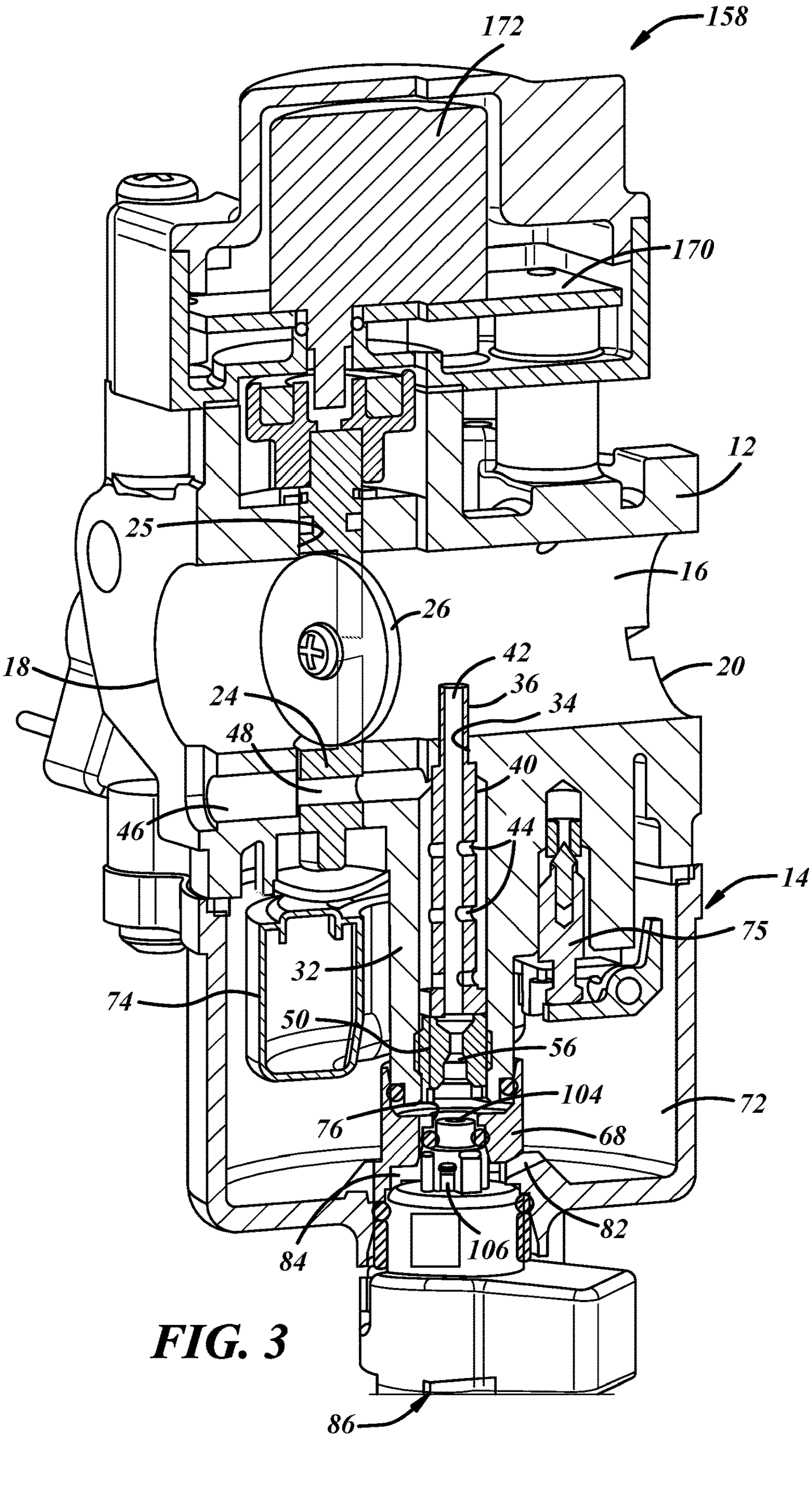
FIG. 3 is another sectional view of the fuel supply device.

As shown in FIGS. 2 and 3, the main body 12 may also include a depending cylindrical column 32 with a through bore 34 in which a fuel supply pipe 36 is closely received, and a counterbore 38. The fuel supply pipe 36 preferably extends out of the bore 34 and into the venturi section 30 of the main bore 16. The counterbore 38 defines an annular gap 40 surrounding the fuel supply pipe 36 that is communicated with a central passage 42 of the fuel supply pipe 36 through a plurality of holes 44 (FIG. 3) in the fuel supply pipe 36.

Figure 11:
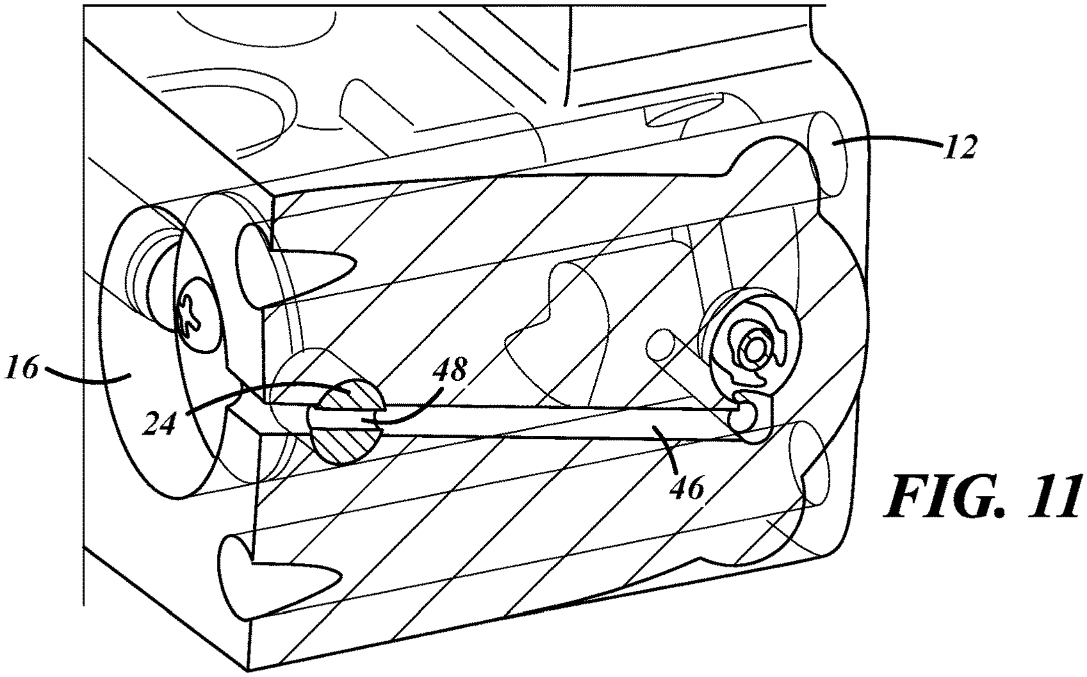
FIG. 11 is sectional view of the main body showing a passage through a throttle valve shaft and a corresponding air passage.
Figure 14:
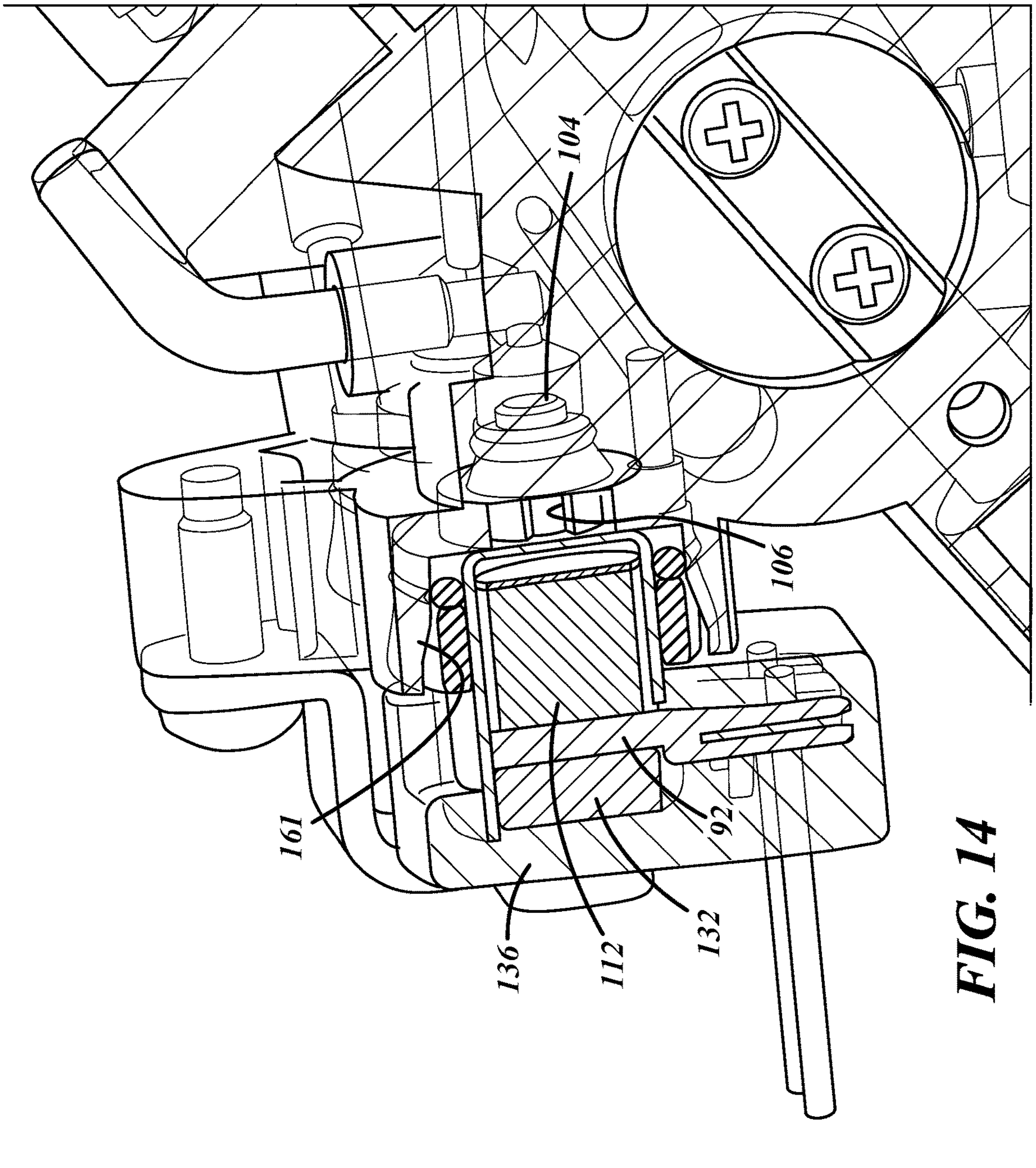
FIG. 14 is a partial perspective view of the main body showing vent valves and vent passages.

As shown in FIGS. 3 and 11, a passage 46 may be provided that communicates the main bore 16 with the gap 40 at a location upstream (relative to the direction of airflow through the main bore 16) of the bore 34, and preferably upstream of the venturi section 30. The passage 46 may extend through the throttle valve shaft 24 so that the throttle valve shaft 24 acts as a valve to control air flow through the passage 46. In such an arrangement, as the throttle valve shaft 24 rotates, a passage 48 through the throttle valve shaft 24 moves relative to the portion of the passage 46 formed in the main body 12. In one position of the throttle valve shaft 24, the passage 48 in the throttle valve shaft 24 may be fully aligned with the passage 46 in the main body 12 enabling a maximum flow rate of air through the passage 46. This position may correspond to the idle position of the throttle valve 22 to provide air into the fuel flow path to enlean the fuel mixture provided to the engine. As the throttle valve 22 is rotated toward its wide open position, the passage 48 in the throttle valve shaft 24 is increasingly misaligned with the passage 46 in the main body 12 to reduce air flow in the passage 46, and the throttle valve shaft 24 may close the passage 46 upon sufficient rotation of the throttle valve shaft 24. This may occur anywhere between the idle and wide open positions of the throttle valve 22, as desired, and preventing air flow into the fuel flow path at greater throttle valve opening angles can provide a richer fuel mixture to the engine to support acceleration and/or higher engine speed or power. Instead of controlling air flow via the throttle valve shaft 24, which may act as a valve as described, a separate valve may be provided in or operatively associated with the passage 46. Such a valve could be electronically controlled, such as a solenoid valve, and may be driven as desired to control the admission of air into the fuel path to provide a desired fuel and air mixture over a wide range of engine operating conditions.

As shown in FIGS. 2 and 3, the fuel supply pipe 36 may include a restriction that may be formed integrally with the fuel supply pipe 36 or in an insert associated with the fuel supply pipe 36. In one presently preferred embodiment, a main jet 50 is received in the counterbore 38 at an end 52 of the fuel supply pipe 36 that is opposite to the end 54 received in the main bore 16. The main jet 50 includes a through passage 56 with an orifice or restriction 58 of a desired size. At least when the passage 46 is open, air may be introduced into the counterbore 38 and mixed with fuel flowing through the fuel supply pipe 36 and into the main bore 16.

As shown in FIG. 1, the float bowl assembly 14 includes a fuel bowl 60 that is coupled to the main body 12 surrounding the column 32 with a seal 62 between the fuel bowl 60 and main body 12 to provide a fluid tight seal between them. When mounted on the main body 12, the fuel bowl 60 may engage a lower end 64 of the column 42 and a seal, such as an O-ring 66 may be provided between a boss 68 of the fuel bowl 60 and the column 32. The fuel bowl 60 defines a fuel chamber 72 in which a float 74 is received. The float 74 is buoyant and hence, responsive to the level of liquid fuel in the fuel chamber 72 so that when the fuel level in the fuel chamber 72 lowers, an inlet valve 75 coupled to the float

74 is opened so that fuel in a fuel tank (not shown) is provided into the fuel chamber 72. Fuel may flow into the fuel bowl 60 under the force of gravity, or fuel may be provided to the fuel bowl by a fuel pump. The fuel bowl 60 includes a passage 76 formed therein and extending to a cavity 78 formed through a lower wall 80 of the fuel bowl 60. At least a portion of the passage 76 may be coaxially aligned with the passage 56 in the main jet 50 and the central passage 42 of the fuel supply pipe 36. Preferably, an outlet end of the passage 76 is coaxially aligned with and disposed generally adjacent to the main jet 50 so that fluid discharged from the passage 76 is directed toward or into the main jet 50. One or more inlets 82 (FIG. 3) may be provided in the boss 68, to permit fuel flow from the fuel chamber 72 into a counterbore 84 of the boss 68.

Figure 5:
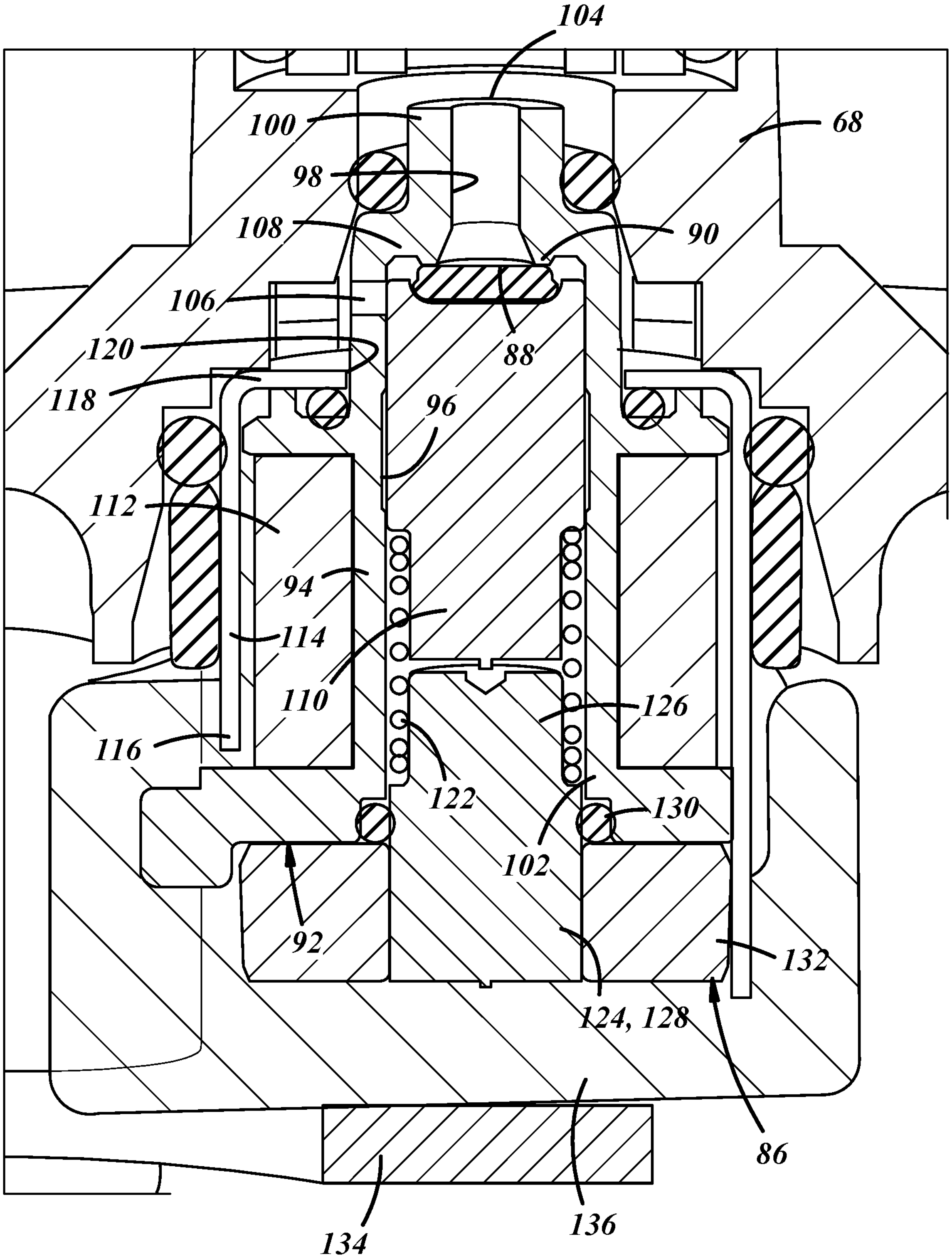
FIG. 5 is an enlarged sectional view showing a fuel valve coupled to a fuel bowl of the fuel supply device.

To control fuel flow into and through the main jet 50, the carburetor 10 includes a fuel valve 86, as shown in FIGS. 2 and 5, through which fuel flows from the counterbore 84 and to the main jet 50. In at least some implementations, the fuel valve 86 is carried by the fuel bowl 60 and part of the fuel valve 86 including a valve member 88 extends into the counterbore 84. A valve seat 90 is provided upstream of the main jet 50, and the valve member 88 is movable relative to the valve seat 90 to control fuel flow through the valve seat 90 and into the main jet 50. In at least some implementations, the fuel valve 86 is an electromechanical device, such as a solenoid valve.

Referring to FIG. 5, the fuel valve 86 includes a bobbin 92 with a body 94 including an internal passage 96, and a fluid flow path or passage 98. The fluid passage 98 may extend into and be defined at least in part by a cylindrical nose or reduced diameter portion 100 of the body 94. The nose 100 may be provided adjacent to one end of the internal passage 96, opposite to an open end 102 of the internal passage. The nose 100 is open at one end defining an outlet 104 of the passage 98 and the valve seat 90 is defined at the other end of the passage 98. Upstream of the valve seat 90, one or more fluid inlets 106 (FIGS. 3 and 5) are provided in the body 94. The valve seat 90 faces the internal passage 96 and may have at least a portion that is radially smaller than the internal passage 96 (e.g. is on a support surface 108 that extends inwardly relative to and/or provides a shoulder in or adjacent to the internal passage), and an armature 110 (see e.g., FIGS. 5-9) received in the passage 96 may open and close, or control the opening and closing of, the valve seat 90 as the armature 110 is driven by the solenoid. While not required, the bobbin 92 and all of the features described above including the valve seat 90, body 94, passages 96, 98, ports/inlets 106, outlet 104, support surface 108 may all be integrally provided in the same component and may be formed in the same piece of material. In at least one implementation, the bobbin 92 is molded from a plastic material and includes all of these features as molded.

As shown in FIG. 5, the fuel valve 86 includes a wire coil 112 wrapped around an exterior surface of the bobbin 92. After the wire coil 112 is provided on the bobbin 92, the bobbin may be inserted into a housing 114. The housing 114 may be generally cylindrical and open at a first end 116 that maybe exposed outwardly from the fuel bowl 60. An opposite, second end 118 of the housing 114 may be received at least partially in the counterbore 84 or cavity of the fuel bowl 60 and includes an inwardly extending wall with an opening 120 through which the nose 100 of the bobbin body 94 extends. The housing 114 may be formed from metal and may define part of the magnetic flux path of the solenoid, if desired.

To improve the sealing/closing of the valve seat 90 when desired, as shown in FIG. 5, a valve member 88 may be provided within the bobbin's internal passage 96, adjacent to the valve seat 90. The valve member 88 may be formed from any suitable material and may be generally circular and sized for receipt in the internal passage 96 and to engage and close the valve seat 90. In at least some implementations, the valve member is at least partially fixed to and moves with the armature 110 relative to the bobbin 92.

The armature 110 may be ferromagnetic and is slidably received within the internal passage 96 so that it may move relative to the valve seat 90 as will be described. A biasing member, such as a spring 122 may be received within the internal passage 96 and have one end engaged with the armature 110, which may have a reduced diameter at an end over which a portion of the spring 122 is received. The spring 122 biases the armature 110 and the valve member 88 in the direction in which the valve member 88 engages the valve seat 90, and the valve 86 is normally closed in this example. That is, unless the armature 110 is moved away from the valve member 88 by a magnetic force generated by the solenoid circuit of the fuel valve, the spring 122 acts on the armature 110 so that the valve member 88 engages and closes the valve seat 90 to inhibit or prevent fluid flow through the valve seat 90.

Figure 17:
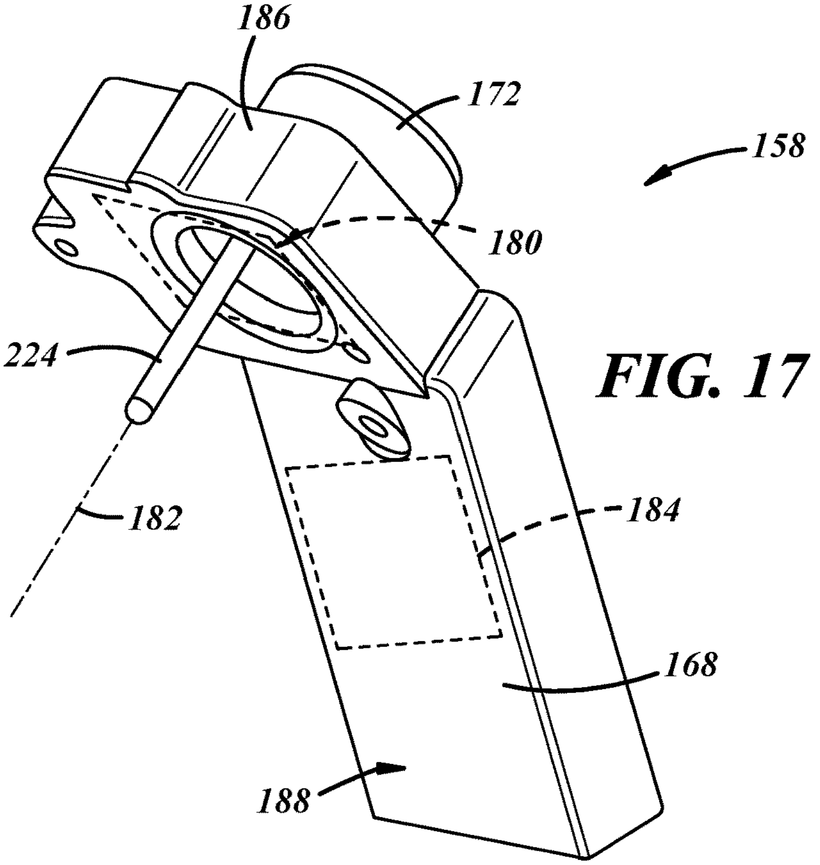
FIG. 17 is a perspective view of the controller assembly.
Figure 18:
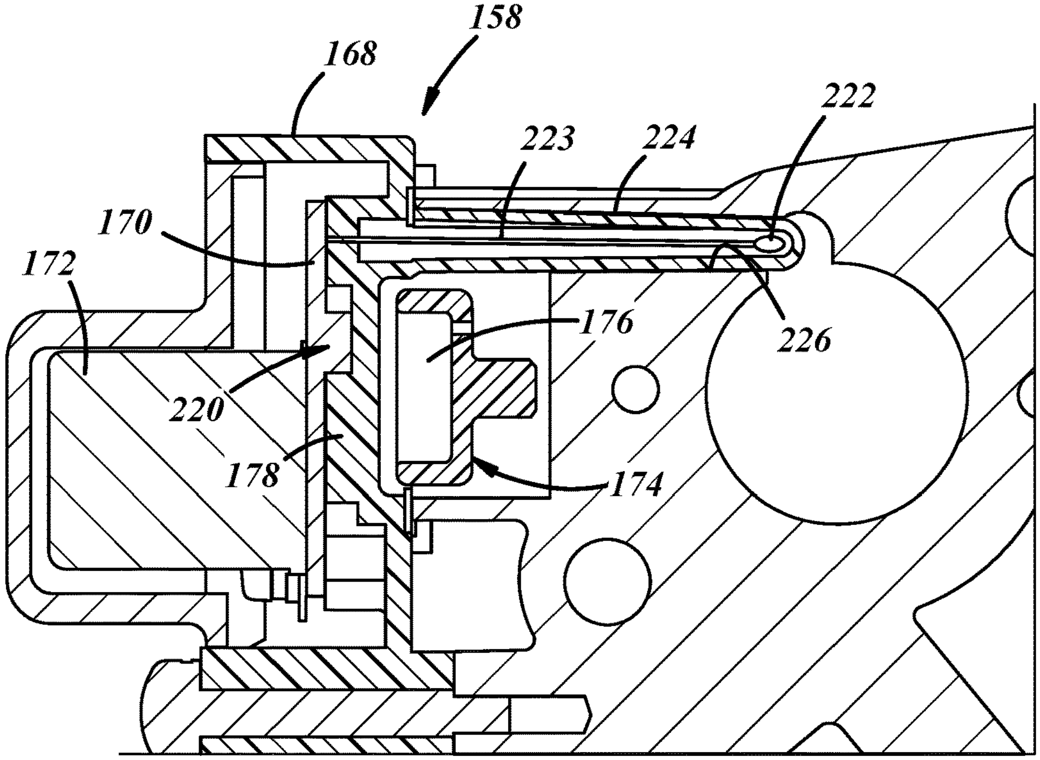
FIG. 18 is a partial sectional view of the main body and the controller assembly.

As shown in FIG. 5, an armature stop 124 is provided in the open end of the bobbin 92 to close the open end, provide a reaction surface for the spring 122 and a stop surface that may be engaged by the armature 110 to limit its travel away from the valve seat 90. As shown in FIGS. 17 and 18, the armature stop 124 may include a spring retention feature, such as a reduced diameter portion 126 at one end and a stem 128 closely received against the bobbin in the internal passage 96. The stem 128 may include retention features, such as outwardly extending barbs, to engage the bobbin 92 within the internal passage 96 to firmly retain the final assembled position of the armature stop 124. A seal 130 may be provided between the armature stop 124 and the bobbin 92 to prevent fuel from leaking out of the internal passage 96 at the first end of the bobbin.

A cap 132 that may be secured to the armature stop 124, secured to or engaged with bobbin 92, and which may be overlapped by a cover received over the end of the fuel valve 86 that is exposed from the fuel bowl 60. The cap 132 may be annular, and the armature stop 124 and cap 132 may be coupled with an interference fit, threads, or otherwise as desired. The seal 130 may be trapped against the bobbin 92 at least in part by the cap 132. A retaining plate 134 may be coupled to the fuel bowl 60 and may engage and retain a cover 136 on the fuel valve 86, which may retain the fuel valve 86 in position.

In use, when electricity is supplied to the fuel valve 86, the wire coil 112 generates a magnetic field that displaces the armature 110 against the spring 122 and into engagement with the armature stop 124. This permits the valve member 88 to be moved away from the valve seat 90 to permit fluid flow through the inlets 106 and then the outlet 104. Upon exiting the outlet 104, fuel flows through the main jet 50 and the fuel supply pipe 36 before entering the main bore 16. When electricity is not supplied to the fuel valve 86, the armature 110 is returned to its closed position by the spring 122 and fluid flow through the valve seat 90 is inhibited or prevented by engagement of the valve member 88 with the valve seat 90.

In at least some implementations, such as that shown in FIGS. 2 and 5, the end of the bobbin 92 that defines the outlet 104 from which fuel exits the fuel valve 86, may be located in the fuel passage 76 of the fuel bowl 60, and may be adjacent to the main jet 50 and coaxially aligned with the main jet 50. While the drawings show an axial gap between the main jet 50 and the bobbin, which may be between zero to twelve times the diameter of the inlet end of the passage 56 of the main jet, the end of the bobbin 92 could engage or be received in an inlet of the main jet 50, if desired. The fuel passage 98 in the bobbin may be axially aligned with the main jet 50. Thus, in at least some implementations, the path of travel of the armature 110 and valve element may be coaxial with the main jet 50 and fuel supply pipe 36, which may be centered in the fuel bowl 60.

The fuel valve 86 is opened and closed to control the flow of fuel into the main bore 16 via the main jet 50 and fuel supply pipe 36. Axial motion of the armature 110 from the open position toward and to the closed position provides an impulse force on fuel within the fuel passage 98 of the bobbin 92, and displaces at least some fuel from the fuel passage 98 and through the outlet 104. This can improve fuel flow into and through the main jet 50 and aid in providing fuel into the main bore 16. Further, fluid flow caused by the moving armature 110 may dislodge and move through the fuel path downstream of the fuel valve 86 and upstream of the main bore 16, at least some fuel from corners or other areas of the fuel path in which fuel may collect. Reducing the volume of fuel that collects in the fuel path rather than moving through the fuel path to the main bore 16, helps to regulate fuel flow in subsequent cycles of the fuel valve 86 and provide a more consistent and controllable fuel flow to the engine. In at least some implementations, the armature 110 moves to its closed position at a rate of between 0.2 m/s and 5 m/s, measured at the time when the valve member engages the valve seat.

In at least some implementations, the impulse force provided on the fuel by the moving armature 110 can be increased by providing a valve member 88 that is flexible and resilient, and which compresses and deforms in a desired manner on the valve seat 90. The compression and deformation of the valve member 88 can vary based upon several factors such as, the material properties of the valve member 88, the thickness of the valve member, the shape and surface area of the valve seat 90, the force on the valve member upon engagement with the valve seat (e.g. due to the mass of the armature 110 and its momentum when the valve member engages the valve seat).

Figure 6:
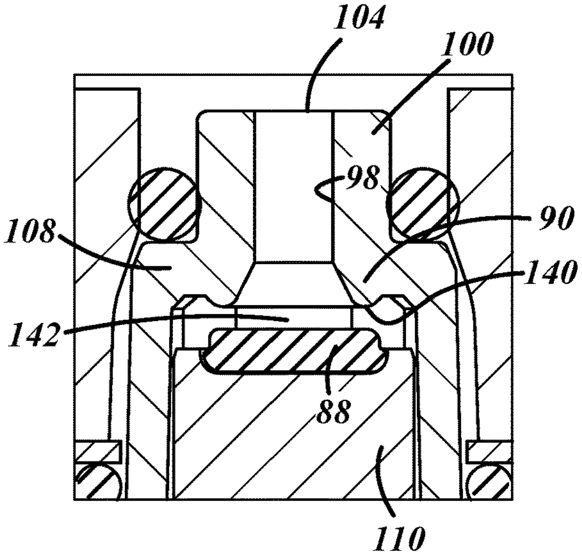
FIGS. 6-9 are partial sectional views showing positions of an armature of the fuel valve relative to a valve seat of the fuel valve.
Figure 7:
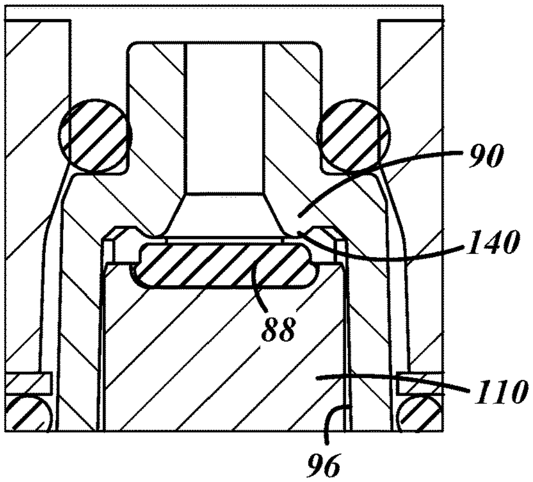

Referring to FIG. 6, in at least some implementations, the valve seat 90 has an annular seating surface 140 that extends from the support surface 108 of the bobbin 92 in the direction of the armature 110. Further, the seating surface 140 may have an outer diameter that is less than the outer diameter of the valve member 88 so that the valve member 88 engages the seating surface 140 on a forward face 142 of the valve member 88 at a location inboard of the periphery or outer edge of the valve member. In at least some implementations, the seating surface 140 is spaced from the bobbin support surface 108 from which the valve seat 90 extends by a minimum distance at least 1% of the thickness of the valve member 88, or within a range of at least 1.01 to 5 times the amount that the valve member is deformed in the axial direction upon impact with the valve seat 90. Thus, this distance may vary as a function of the closing force and the material of the valve member. In at least some implementations, the distance is great enough so that the valve member does not engage the support surface radially outward of the valve seat.

In at least some implementations, a radial width of the seating surface 140, which is the radial distance between inner and outer diameters thereof, is between 1% to 40% of the inner diameter of the seating surface 140. In at least some implementations, the seating surface 140 has an area contacted by the valve member of between 0.001 to 2.75 times a theoretical annular area 0.5 mm wide, where the width is the outside diameter minus the inside diameter of the annular area, and where the annular area is centered about the ring of line contact where the valve member 88 initially engages the seating surface 140. And the valve seat 90 may be tapered or rounded, so the valve member 88 initially engages the seating surface 140 with line contact and upon deformation of the valve member, the valve member 88 engages additional area of the valve seat 90 to distribute the force over a greater area and improve the durability of the valve element 88. In at least some implementations, a radius of curvature of the valve seat may be between 0.15 mm and 2.0 mm. Also, fluid flow may be improved by providing a rounded valve seat without 90 degree corners or other severe discontinuities that may inhibit flow or cause turbulent flow. Thus, the valve seat 90 may be radially narrower at the seating area than at a base portion of the valve seat connected to/extending from the supporting surface 108.

Figure 8:
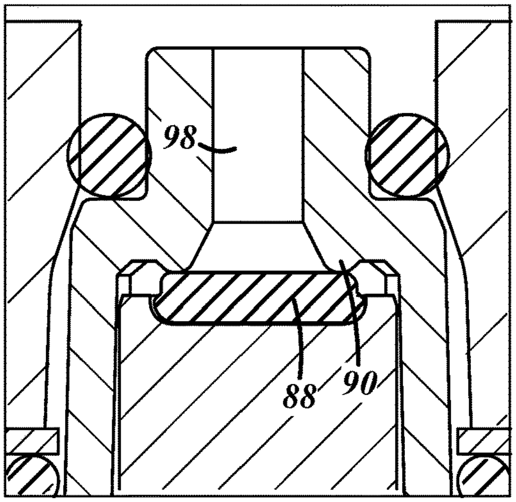
Figure 9:
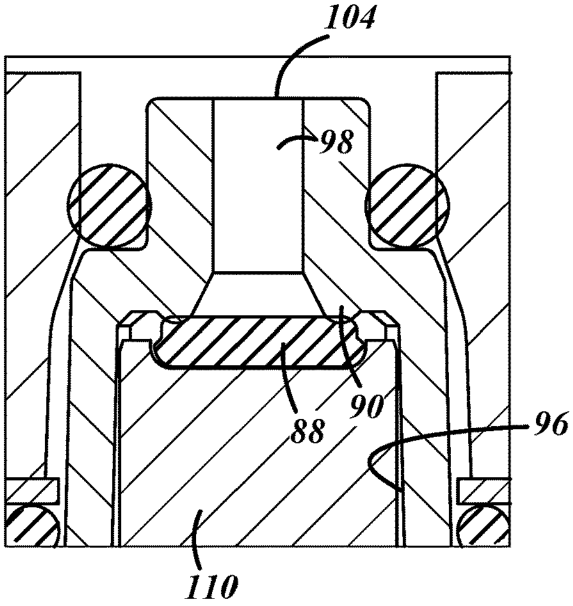

In at least some implementations, the valve member 88 is formed from a polymeric material such as rubber, silicone, fluorine rubbers, Acrylonitrile Butadiene (or Hydrogenated NRB), Fluorocarbon Rubber (FKM), Ethylene-Propylenes (EPDM), Chloroprene, Polyester Urethane, or other related elastomer compounds. And the valve member may have a flat forward face 142 (when not compressed against the valve seat) a thickness between 0.15 mm and 2.0 mm and a hardness between 30 and 90 on the Shore A scale. FIGS. 6-9 show movement of the armature from an open position (FIG. 6) to a position between open and closed (FIG. 7), to a closed position when the valve member 88 engages the valve seat 90 (FIG. 8), to an over-travel position compressing the valve member 88 against the valve seat 90 (FIG. 9). In at least some implementations, after initial engagement of the valve member 88 with the valve seat 90, the armature 110 may travel an additional 0.01 to 0.99 times the distance that the valve member 88 extends beyond the armature 110, which such additional travel causing the aforementioned compression and deformation of the valve member 88. In at least some implementations, half or more of the volume of the valve member 88 is overlapped or received in a cavity of the armature 110 and half or less of the valve member 88 extends axially beyond the armature 110, although other arrangements may be used. The compression of the valve member 88, as shown in FIGS. 8 and 9, causes the portion of the valve member 88 radially inside of the valve seat 90 to elastically extrude or protrude forward toward the outlet 104. This protrusion of the valve member 88 displaces fuel and provides a dynamic fluidic shock impulse to the downstream fuel passage 98 and the fuel path leading to the main jet 50 while also achieving a fuel compression event which may be between 0.001 mm^3 and 4 mm^3. A valve member 88 that is too hard or too thin might not compress sufficiently to provide the desired impulse on the fuel, and may rebound or bounce off the valve seat 90 after initial engagement and allow additional fuel to flow through the outlet 104 which may reduce the ability to more precisely control the fuel flow rate through the fuel valve 86. A valve member 88 that is too soft may tend to remain closed, may open slower than desired, and may be subject to excess strain resulting in potential abrasion or tearing in the forward face 142/contact surface of the valve member 88.

In at least some implementations, at least part of the internal passage 96 of the bobbin 92 in which the armature

110 is received has a diameter that varies along its axial length, and which may become smaller closer to the valve seat 90. This portion of the internal passage 96 may be linearly tapered and may uniformly narrow along its axial toward the valve seat. This may permit a relatively small gap between the armature 110 and bobbin 92 adjacent to the valve seat 90 and a larger gap spaced axially farther from the valve seat 90. The smaller gap, which may be between 0.1 and 0.2 mm, for example, may help accurately guide the armature 110 as it closes to provide a desired orientation of the armature 110 and a desired engagement of the valve member 88 with the valve seat 90. In at least some implementations, the smallest diameter clearance between the armature 110 and bobbin 92 may be provided along 50% or less of the axial length of the armature 110. The central passage could have a constant diameter for the entire length of the armature, if desired. A larger gap could permit the armature 110 to tilt relative to the valve seat 90 and may provide a varied engagement of the valve member 88 on the valve seat 90, and a varied compression of the valve member, depending upon the angle of engagement. Providing a small gap between the armature 110 and the bobbin 92 along all or more than a majority of the armature's axial length could increase friction between them and slow down armature 110 movement or require higher forces to adequately move the armature 110. In at least some implementations, the taper angle of the internal passage 96 in the area of the armature 110 is constant and may be between 2 degrees and 5 degrees relative to the axis of the internal passage 96. Of course, the angle may vary along the axial length of the internal passage 96, as desired.

Figure 4:
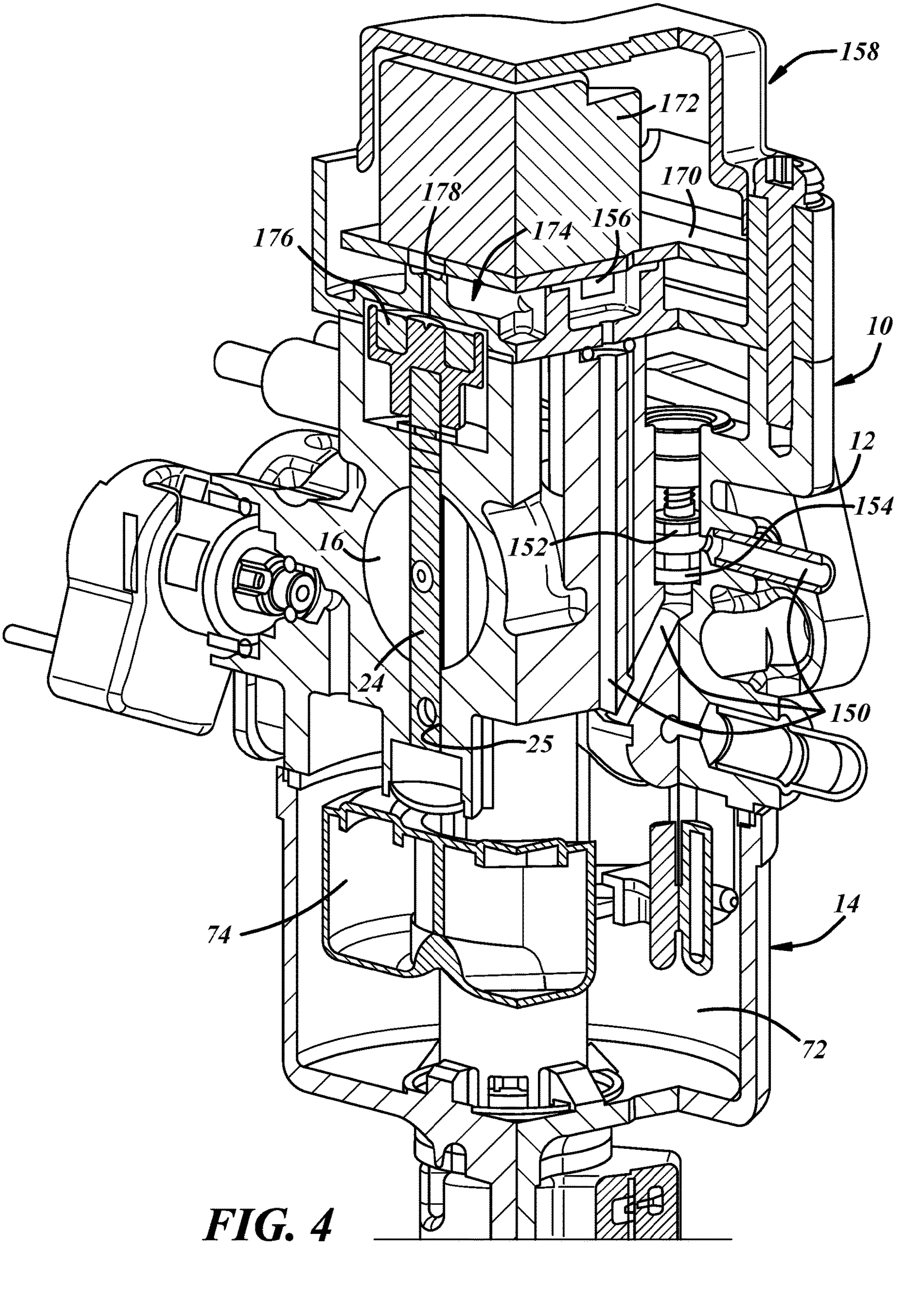
FIG. 4 is another sectional view of the fuel supply device.
Figure 22:
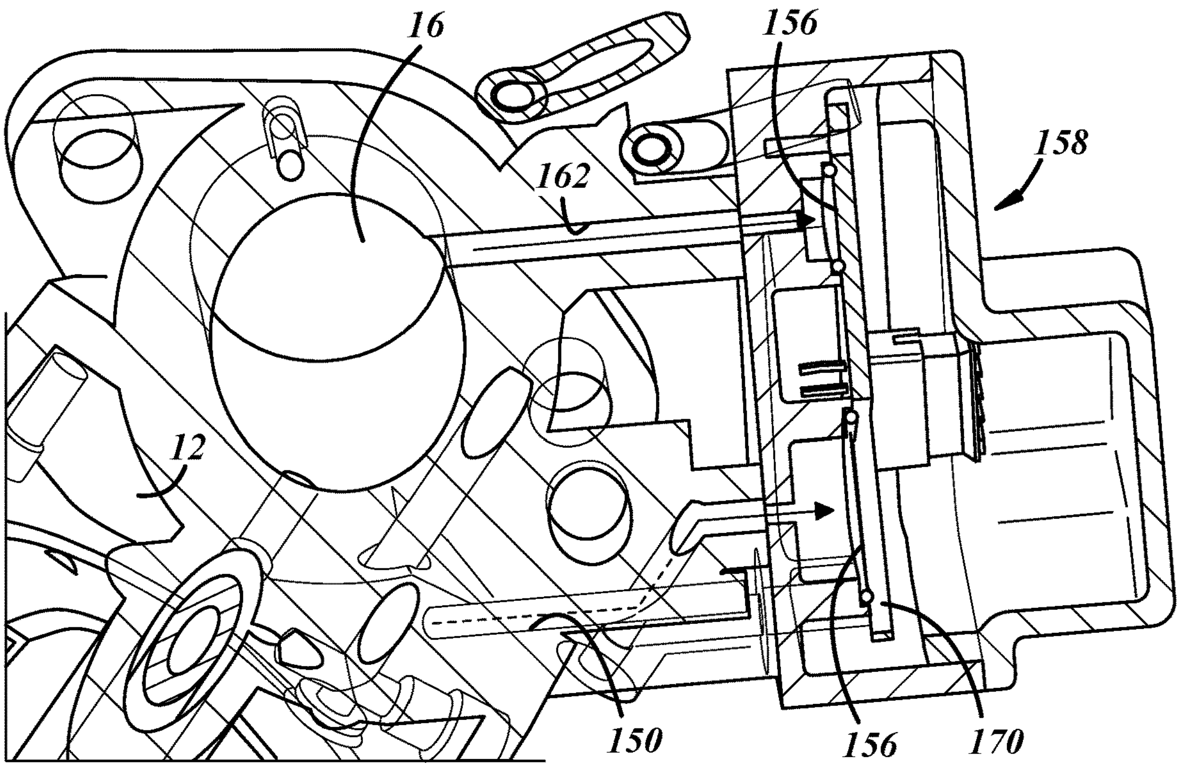
FIG. 22 is a sectional view of a portion of the main body and controller assembly of the fuel supply device.
Figure 27:
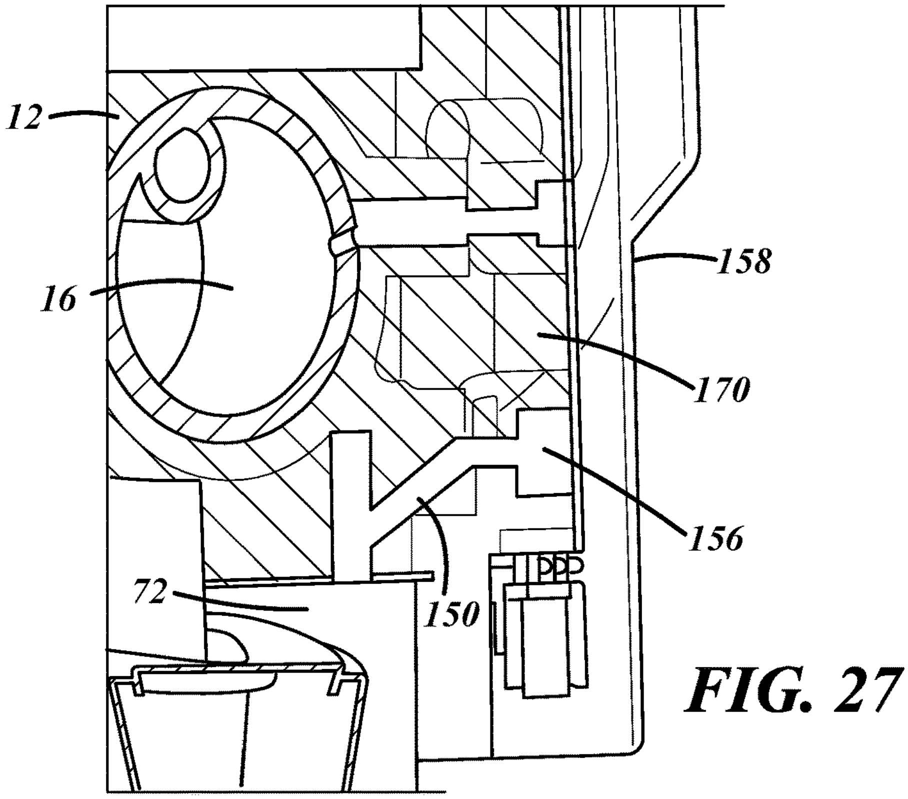
FIGS. 27-29 are partial sectional views of a fuel supply device showing vent and vapor purge paths, and related pressure sensors according to different implementations that may be used separately or in combination.
Figure 24:
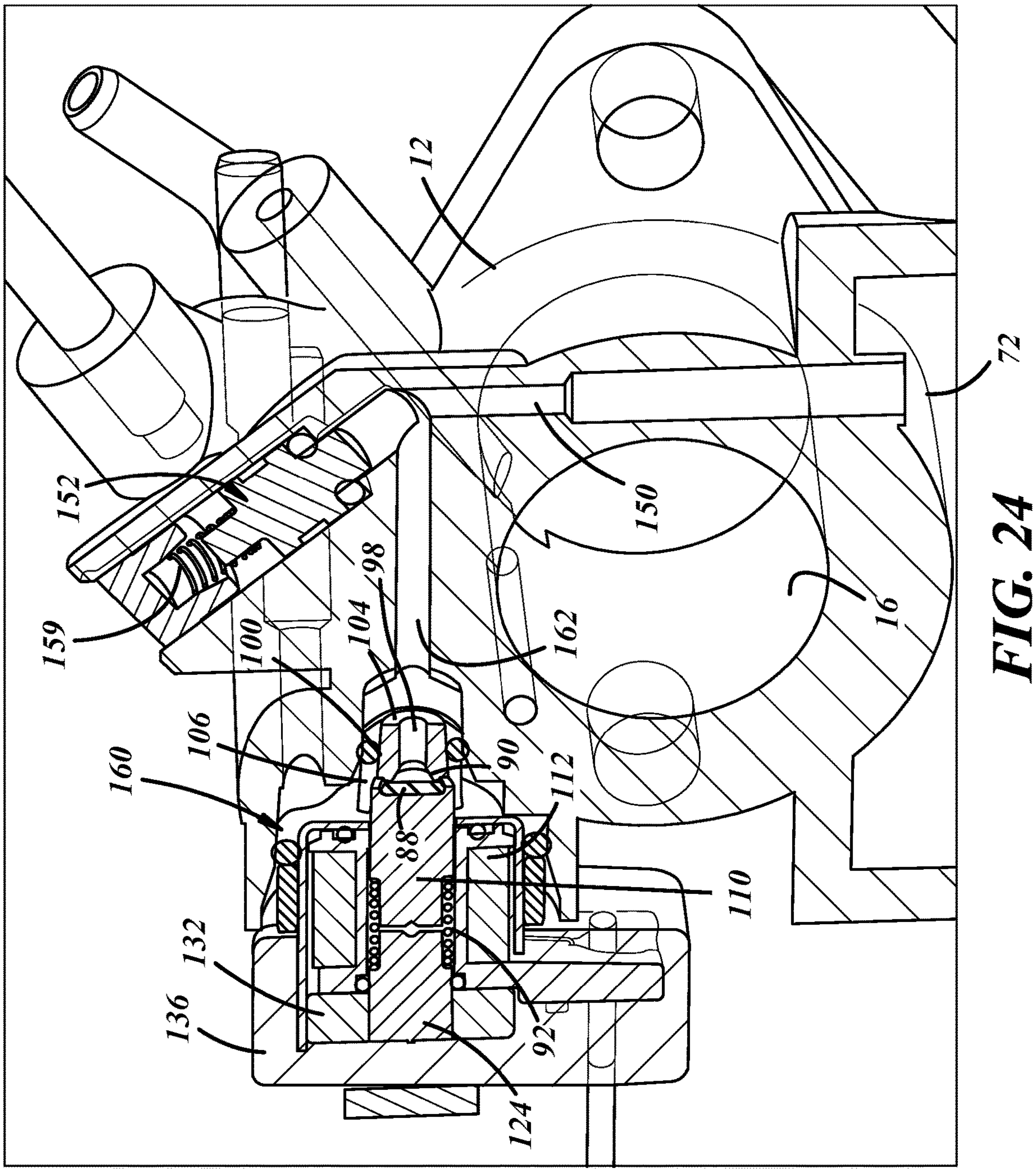
FIG. 24 is a partial sectional view of the main body showing the fuel valve and a vent valve and vent passages.

In addition to fuel, fuel vapor may be present within the fuel chamber 72 of the fuel bowl 60, and which may increase or otherwise affect the pressure within the fuel chamber 72. As shown in FIG. 4, to vent vapor from the fuel chamber 72, a vent passage 150 may be provided in the main body 12 and a vent valve 152 may be associated with the vent passage 150 to selectively open and close the vent passage to selectively permit and prevent fluid flow through the vent passage. The vent passage 150 may extend through the vent valve 152 or through a valve seat 154 selectively engaged by the valve, and may communicate at one end with the fuel chamber 72 and at its other end with the fuel tank, a vapor canister or vapor collection or cleaning device, the engine air cleaner/filter or an engine intake manifold. The vent passage 150 may also extend to a pressure sensor 156, which may be mounted to a controller assembly 158 that may be mounted on the main body 12 or located remotely from the main body, as desired. Two such sensors are shown in FIG. 22 for two different vent paths, one of which is directed to a specific engine manifold sensor, the other arranged for sensing fuel chamber pressure. The vent valve 152 may be electronically controlled, or may be a pressure relief valve that opens when a pressure at the valve 152 is above a threshold pressure, and which closes when the pressure is below the threshold pressure. Such a valve 152 may include a valve element that is closed on the valve seat 154 by a spring 159 (labeled on similar valve in FIG. 24), the force of which is overcome when the pressure on the valve element exceeds the threshold pressure to permit the valve element to disengage from the valve seat 154.

Figure 16:
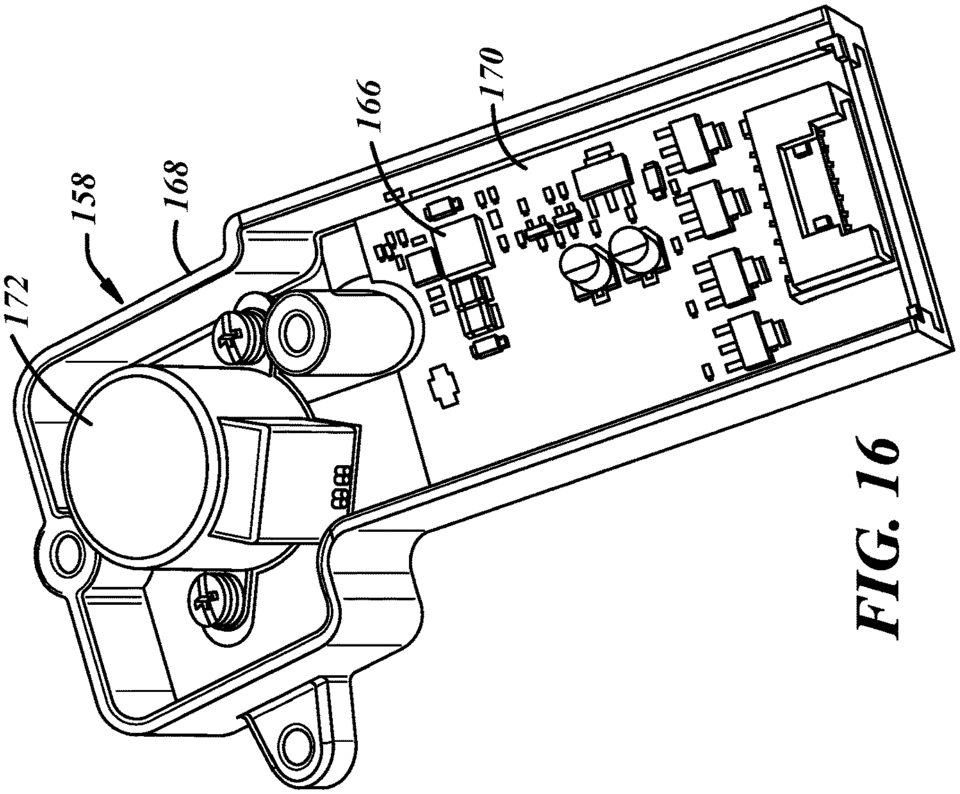
FIG. 16 is a sectional view of the controller assembly.
Figure 15:
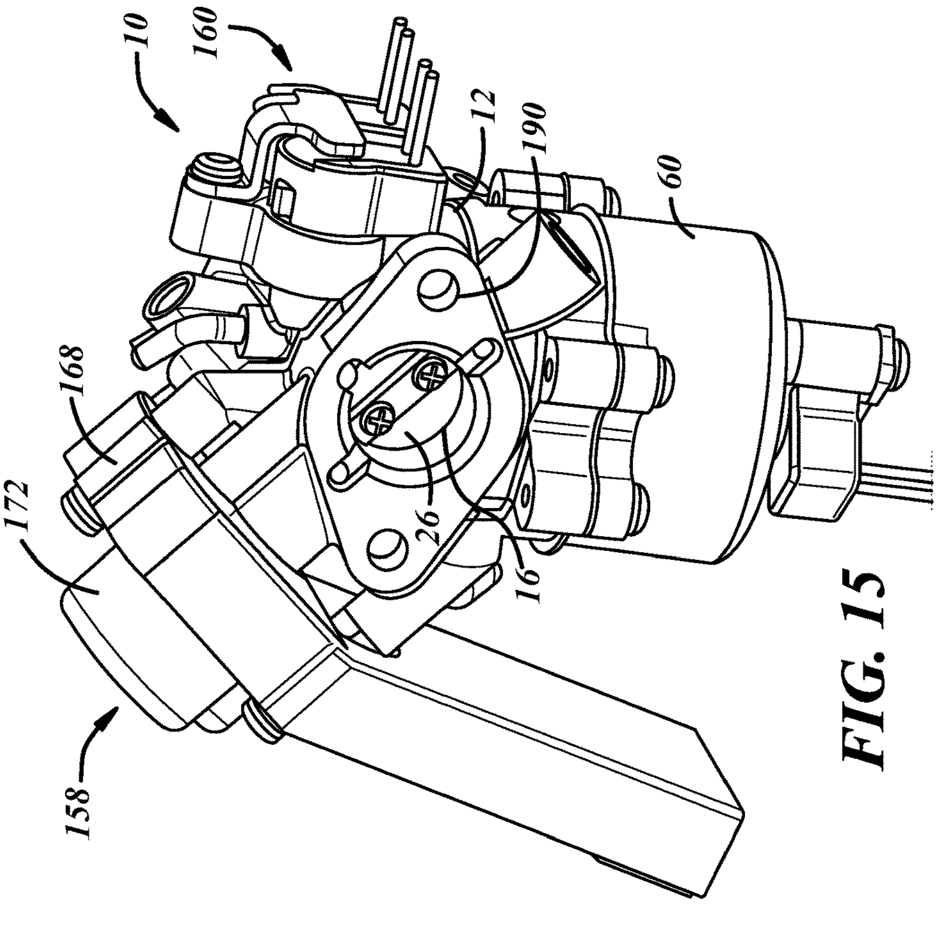
FIG. 15 is a perspective view of the fuel supply device including a controller assembly.

In addition to or instead of the vent valve 152 and vent passage 150 described above, one or more vent valves 160 and associated vent passages 162 may be provided, as shown in FIGS. 12-14, 24 and 27-29. The vent passages 162 may be defined in the main body 12 and may communicate with the fuel chamber 72 and with a port 164 from which the vapor may exit or enter the vent passages 162. In at least some implementations, the vent valves 160 may be constructed similarly to the fuel valve 86. Using the same reference numerals for similar parts, and referring to FIGS. 14 and 24, the valves 160 may have a similar bobbin 92 and armature 110 arrangement, providing a valve seat within the bobbin, and ports 106 through the bobbin on one side of the valve seat, and with a passage (e.g. passage 98 and outlet 104) on the opposite side of the valve seat, to permit fluid flow when the valve element is open from the valve seat. The valves 160 may have a similar wire coil 112, cap 132 and cover 136, etc., and may be received in suitable cavities 161 in the main body 12 that are open to the vent passages 162. The fluid flow through these vent valves 160 may occur in both directions, to permit vapor to be vented from the fuel chamber 72, such as to a vapor canister or an engine intake manifold, and to permit vapor to be purged from a vapor canister and moved into the fuel chamber 72, as desired. Engine pressure signals may be used to move vapor through the vent passage(s) 162, as desired. For example, when a vent valve 160 is open, the reduced pressure within the fuel chamber 72 which draws fuel into the main bore 16 from the fuel chamber 72, can cause vapor and/or air to flow into the fuel chamber 72 through the vent valve 160. While two such vent valves 160 are shown, only one or more than two may be provided. In the implementations shown in FIGS. 12-14, one of the two valves (the one located to the right of the other in FIG. 13) permits fluid flow into the fuel supply device from, for example, a vapor canister to permit purging of the canister, and the other valve controls fluid (e.g. vapor) flow out of the fuel supply device. The operation (e.g. opening and closing) of the vent valve(s) 160 may be controlled by a suitable processor/controller 166 (FIG. 16) which may be part of the controller assembly 158.

In at least some implementations, and with reference to FIGS. 15-18, the fuel supply device 10 includes a controller assembly 158 that includes a housing 168 mounted to the main body 12. The housing 168 may enclose a circuit board 170 on which the controller 166 is mounted and which may include other components. The controller 166 may be used to operate the fuel valve 86, vent valve(s) 152, 160 and other electronically controlled devices. For example, the throttle valve shaft 24 may be driven for rotation by an electric motor 172, which may be a stepper motor or which may include a rotary sensor 174 (e.g. as shown in FIGS. 4 and 18, a non-contact magnetic sensor including a magnet 176 rotated with the throttle valve shaft 24 and a sensor 178 on the circuit board 170 providing an output to the controller 166). The motor 172 may be carried by the controller assembly 158, and may be located within or on and extending through the housing 168, if desired.

In at least some implementations, as shown in FIG. 17, an imaginary plane 180 perpendicular to the axis of rotation 182 of the motor 172 is at an angle of 30 degrees or more relative to plane 184 parallel to the circuit board 170. The housing 168 may likewise include a first portion 186 that receives the motor 172 and a second portion 188 that receives the circuit board 170, with a similar angle (30 degrees or more) between the first portion 186 and the second portion 188. This facilitates receipt of the housing 168 on an existing float bowl carburetor or throttle body to simplify retrofitting the fuel supply device 10 with electronic fuel or vapor control in fuel systems without electronic fuel or vapor control. With control of the motor 172, an electronic air bleed valve to control air flow in the passage 46, such as described above, can be operated as a function of the throttle valve position or rate of movement of the throttle valve 22, for example, to control air flow into the fuel supply pipe 36 via passage 46. Further, the pressure sensor 156 may be mounted on the circuit board 170 and may provide an output to the controller 166 to, for example, permit operation of one or more vent valves 152, 160 as a function of the pressure in the fuel chamber 72 or elsewhere (e.g. intake manifold, inlet of main bore, etc).

The controller 166 and electronic vent valves 152, 160 permit active vapor purge control for discreet venting of fuel vapor. The vent valves may be two position on-off design valves, or valves having multiple open positions. The vent valves may be held open for a suitable duration to achieve a desired venting or they may be dithered or pulsed rapidly open and closed (or among multiple open positions and closed) control to maintain a desired threshold of vapor pressure in a cavity or the fuel chamber in lieu of bi-stable operation at lower frequencies.

Generally, the fuel supply device 10 is located between the downstream engine intake manifold and an upstream air intake box/filter housing. The corresponding interface or mounting flanges 190 (which connects to the air intake box/filter housing) and 192 (which connects to the intake manifold) at each end of the fuel supply device 10, illustrated in FIG. 1, can be provided with direct access for vent passage porting to either engine vacuum conditions in the intake manifold or a source of near ambient pressure at the air intake box. If the vent passage outlet (e.g. port 164, FIG. 12) is directed to the engine intake manifold during run conditions, the vapor is pulled into the manifold to supplement the fuel and air mixture provided to the engine intake manifold. The pressure in the engine intake manifold can vary greatly. The vent valve(s) 152, 160 can be controlled by the controller 166 to modulate the rate of depressurization, or additional venting can be drawn from a passage communicating with the air intake box (for example) to replace or stabilize pressure in the fuel chamber 72. Vapor also can be vented to a passive carbon canister that can either absorb the mass of vapor exiting the vent passage(s), or release contained vapor in a reverse flow process which may be driven by sub-atmospheric pressure in the engine intake manifold.

Figure 19:
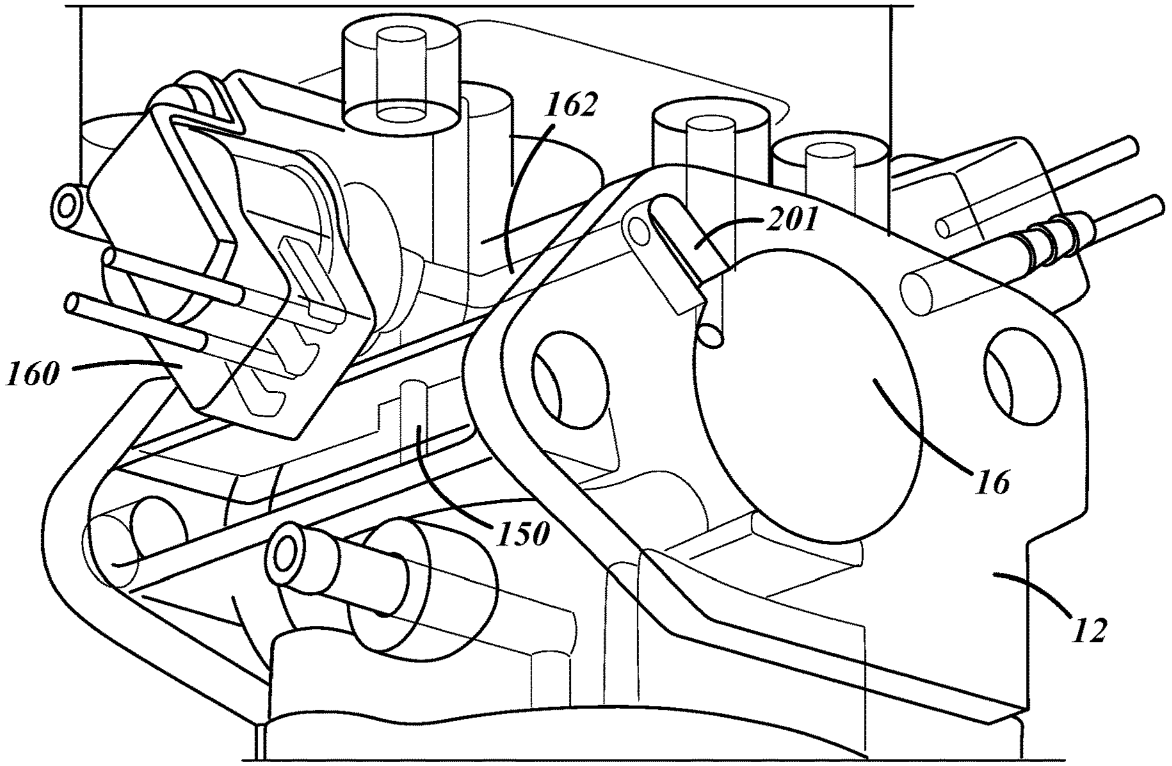
FIG. 19 is an end view of a mounting flange of the fuel supply device or an engine intake manifold including vent ports therein.
Figure 20:
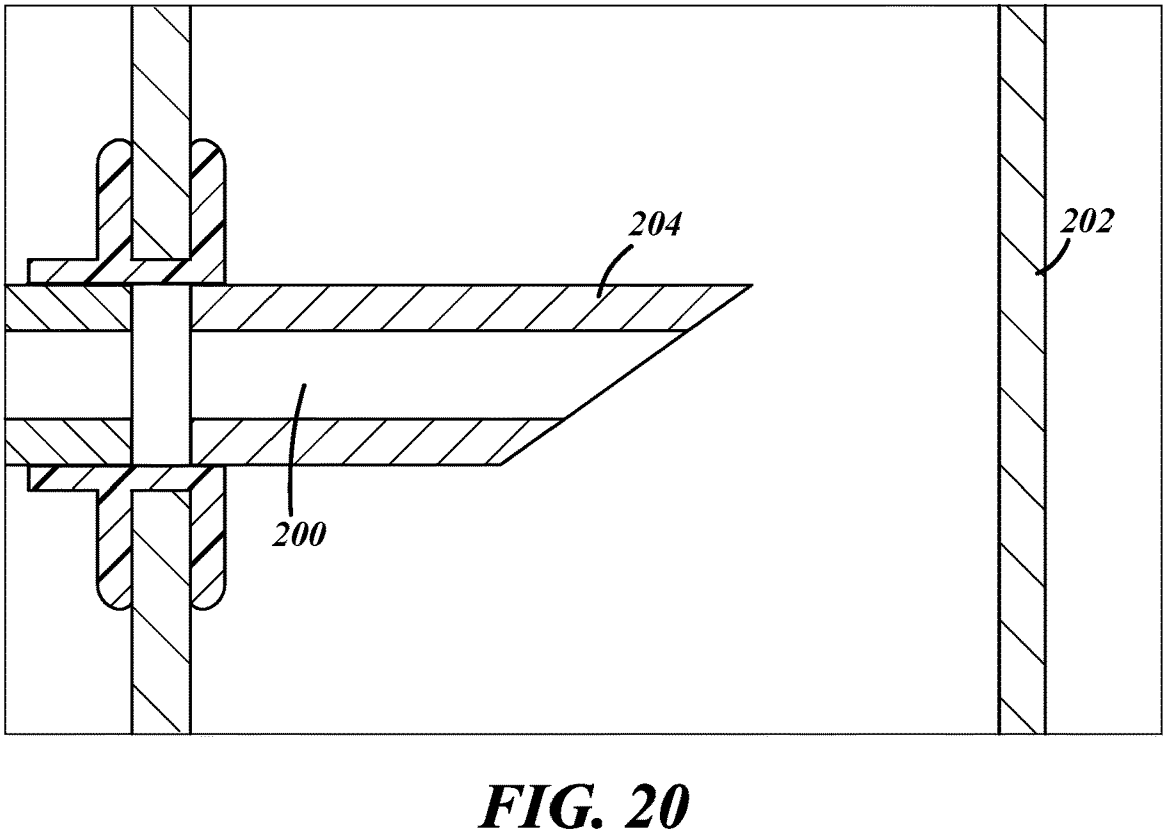
FIG. 20 is a sectional view of a vent tube having a shroud or cover.
Figure 25:
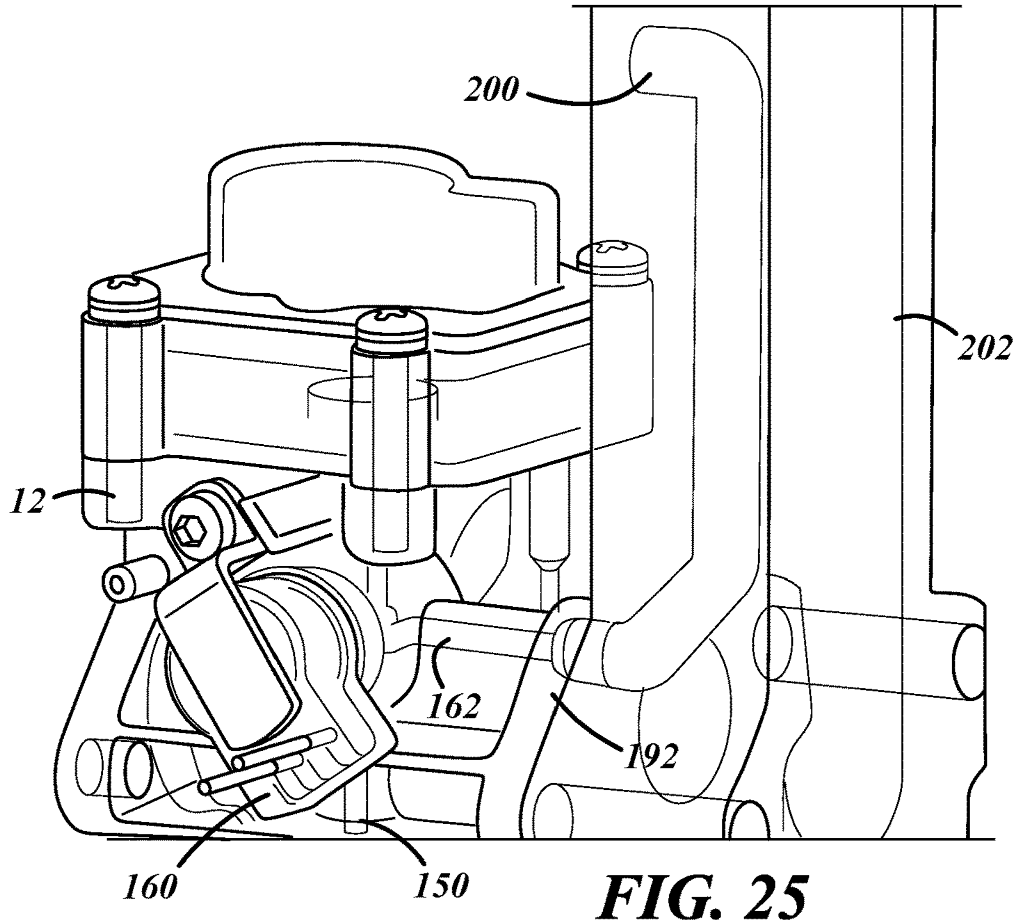
FIG. 25 is an end view of a portion of an intake manifold of an engine including a snorkel tube portion of a vent circuit.
Figure 26:
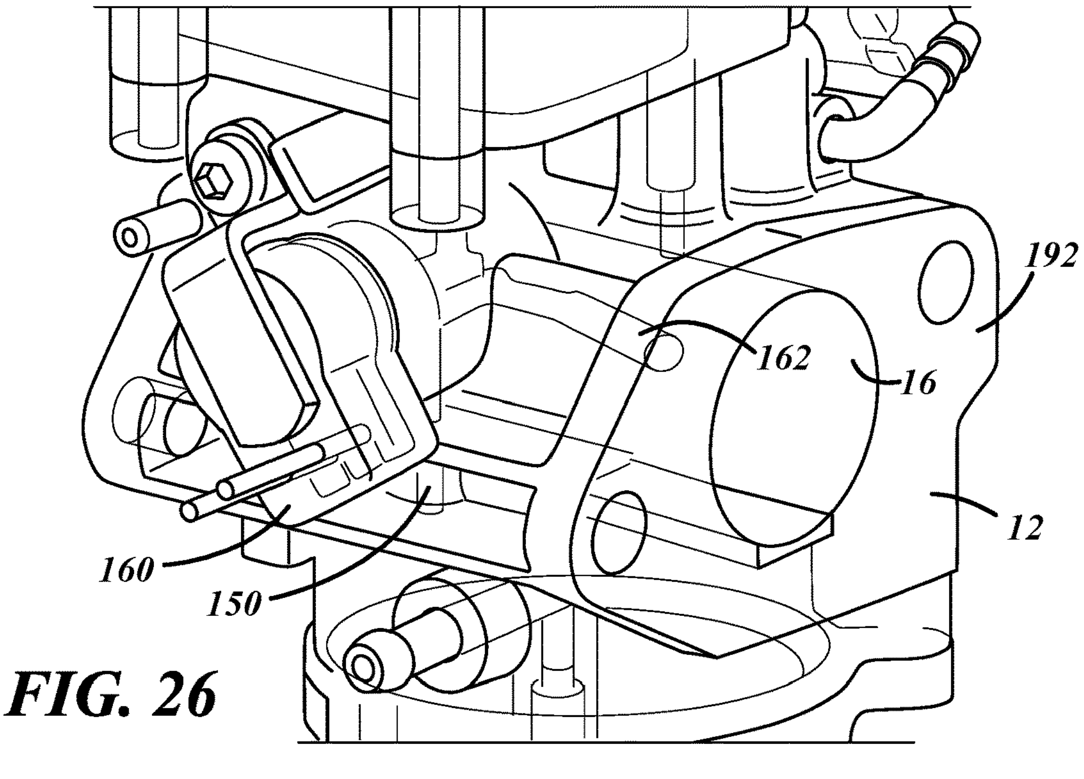
FIG. 26 is an end view of a fuel supply device showing vent ports in a mounting flange of a main body.
Figure 28:
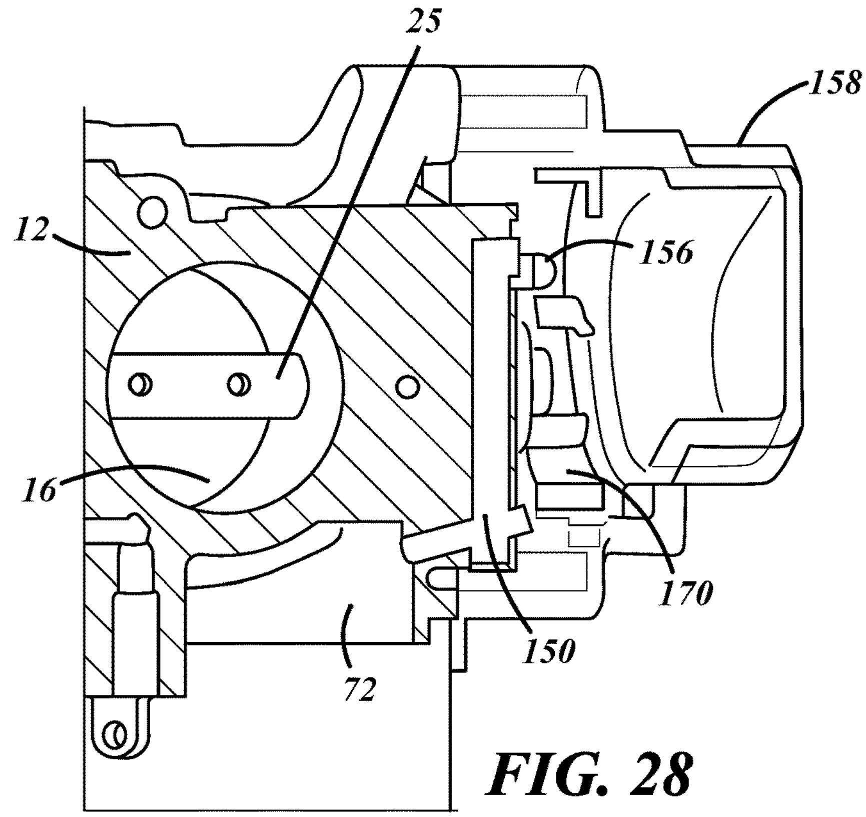
Figure 29:
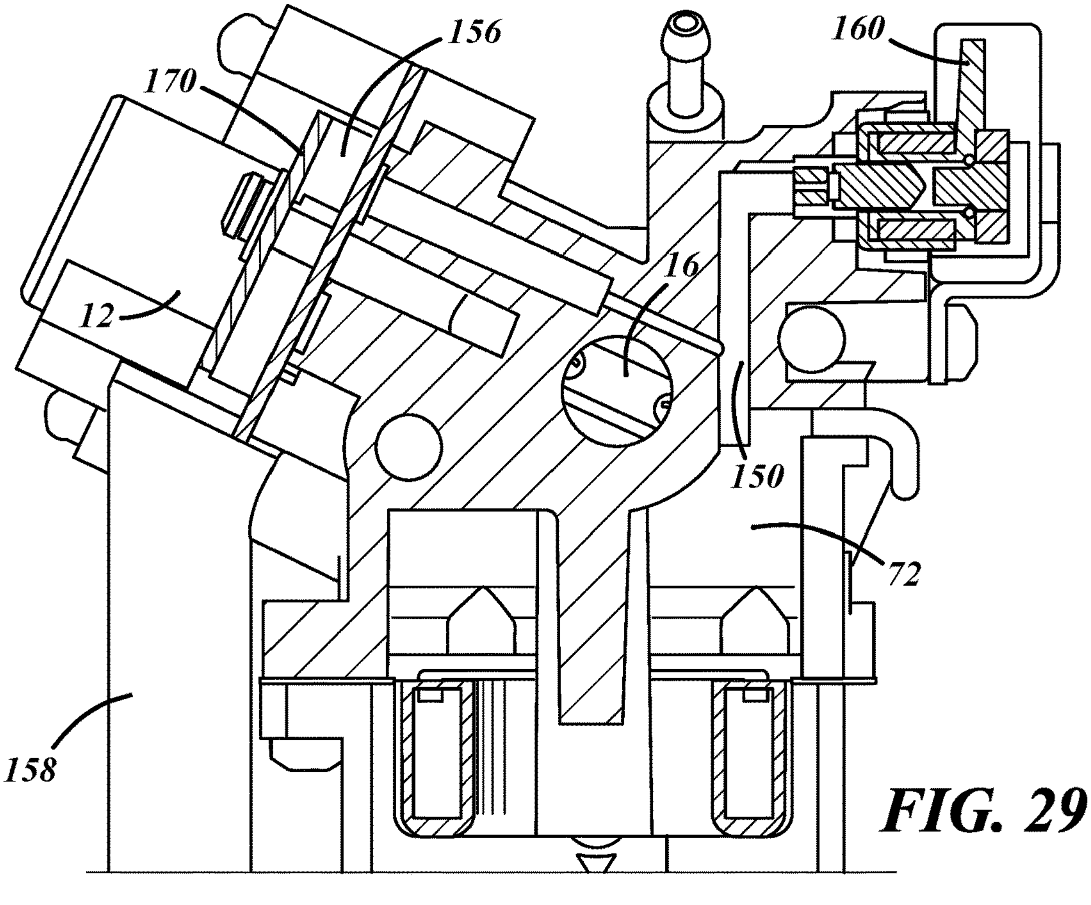

Referring to FIG. 25, vent passage positioning may be provided, such as by an ancillary snorkel tube 200 or similar conduit that may enable desired placement of the end of a vent passage 162 and extending into the intake manifold 202 and/or intake air box instead of a surface port 201 (FIG. 19) through a side wall or flange 190, 192 of the main body and/or of the intake manifold 202 or intake air box (although such ports may be used). The snorkel tube 200 configuration permits the tube end to be strategically located to, for example, attenuate pressure pulsations or find a more quiescent location for interface with the vent circuit. FIG. 26 illustrates the fuel supply device with the vent valve 160 and vent passage 162 as shown in FIG. 25, but with the intake manifold 202 removed. In at least some implementations, a shield or shroud 204 (FIG. 20) may be provided at or on the end of the tube to further dampen local pressure fluctuations at the entrance of the tube for improved pressure stability of the vent passage.

Figure 10:
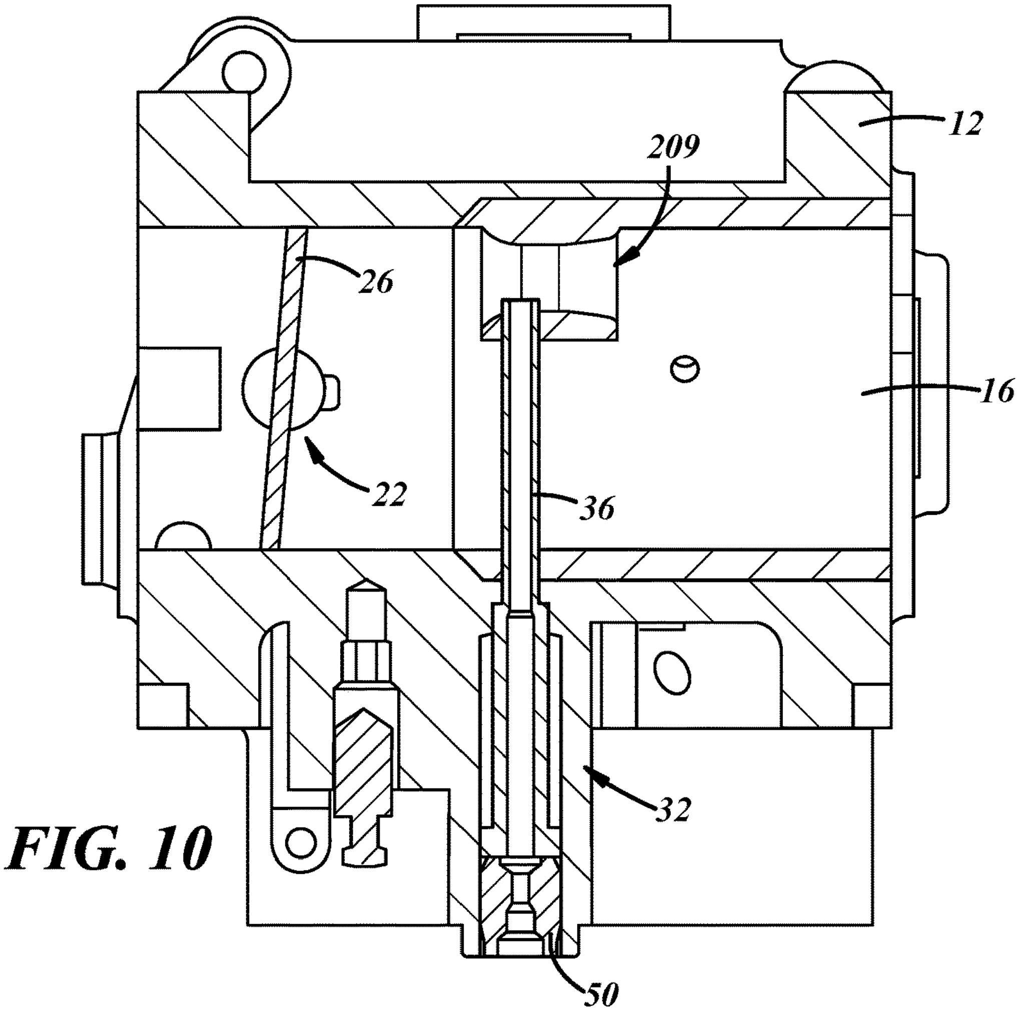
FIG. 10 is a sectional view of a main body of the fuel supply device.
Figure 21:
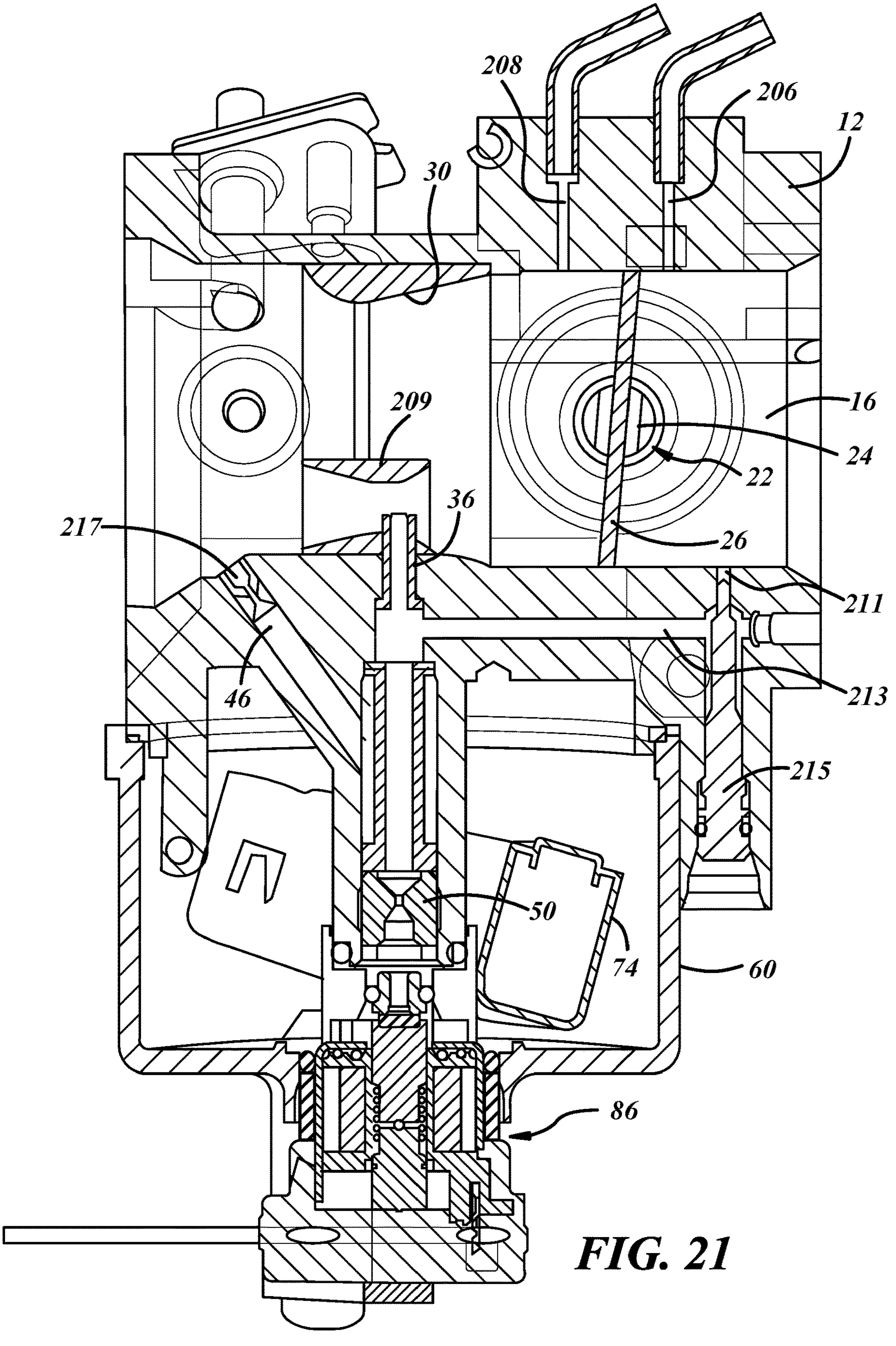
FIG. 21 is a sectional view of the fuel supply device showing vent passages arranged relative to a throttle valve head.

Another active vapor vent arrangement is shown in FIG. 21 and includes one or more vent passages, with two passages 206, 208 shown, positioned relative to the throttle valve head 26 so that the throttle valve head 26 can control, at least partially, the communication of the one or more vent passages 206, 208 with the intake manifold or intake air box. In this arrangement, the amount or extent of communication of pressure signals with the passages 206, 208 varies as the position of the throttle valve head 26 changes. In the example shown, one vent passage 206 opens into the main bore 16 upstream of the throttle valve head 26 (when in its idle position as shown in FIG. 21) and another vent passage 208 opens into the main bore 16 downstream of the throttle valve head 26 (when in its idle position). As an example, the downstream passage 208 is exposed to sub-atmospheric pressures when the throttle valve head 26 is in its idle position and positions near idle (e.g. closer to idle than wide open throttle (WOT) position) to assist vapor venting to a carbon canister, then as the throttle valve head 26 rotates from a mid-throttle position to WOT throttle position, the magnitude of vacuum is reduced to reduce or terminate venting to the carbon canister. The upstream vent passage 206 is exposed to intake air box pressure (e.g. ambient or near) when the throttle valve head 26 is at idle, and is increasingly exposed to the intake manifold pressure as the throttle valve head 26 moves toward the WOT position. In this example fluid supply device, the fuel supply pipe 36 opens into a secondary or boost venturi 209 received in the main bore 16 and arranged to provide a localized air flow at the open end of the fuel supply pipe 36 to provide a desired fluid flow through the fuel supply pipe (a similar arrangement is shown in FIG. 10, with the boost venturi on a wall of the main bore 16 opposite to the column 32). A second fuel port 211 received fuel from a passage 213 that branches off the fuel supply pipe 36 and flow through the second fuel port 211 may be controlled by a needle valve 215 carried by the main body 12 and having a head received in the port 211 or passage 213 to reduce fluid flow therethrough. The air passage 46 may be open to the main bore 16 with a jet 217 or other restriction therein to throttle air flow.

In typical automotive or other high pressure fuel system applications, a high pressure fuel rail maintains a regulated high fuel pressure, such as 60 psi, in the system and so these systems have minimal difficulty with vapor management because the high pressure reduces or prevents vapor formation from the liquid fuel. In contrast, low pressure fuel systems, like that described herein in which the fuel pressure is typically maintained between 0 psi and 12 psi, but which may see higher pressures under certain conditions (e.g. elevated temperature), with other implementations using nominal fuel pressures up to 25 psi (up to 35 psi in some conditions). These lower pressure systems have challenges with vapor formation that is further exacerbated with increasing temperatures, atmospheric pressure, vibration/fuel slosh, and age of the fuel. For low pressure fuel systems, it can be advantageous to monitor the vapor pressure to assist in controlling the vent valves and vapor flow.

Figure 23:
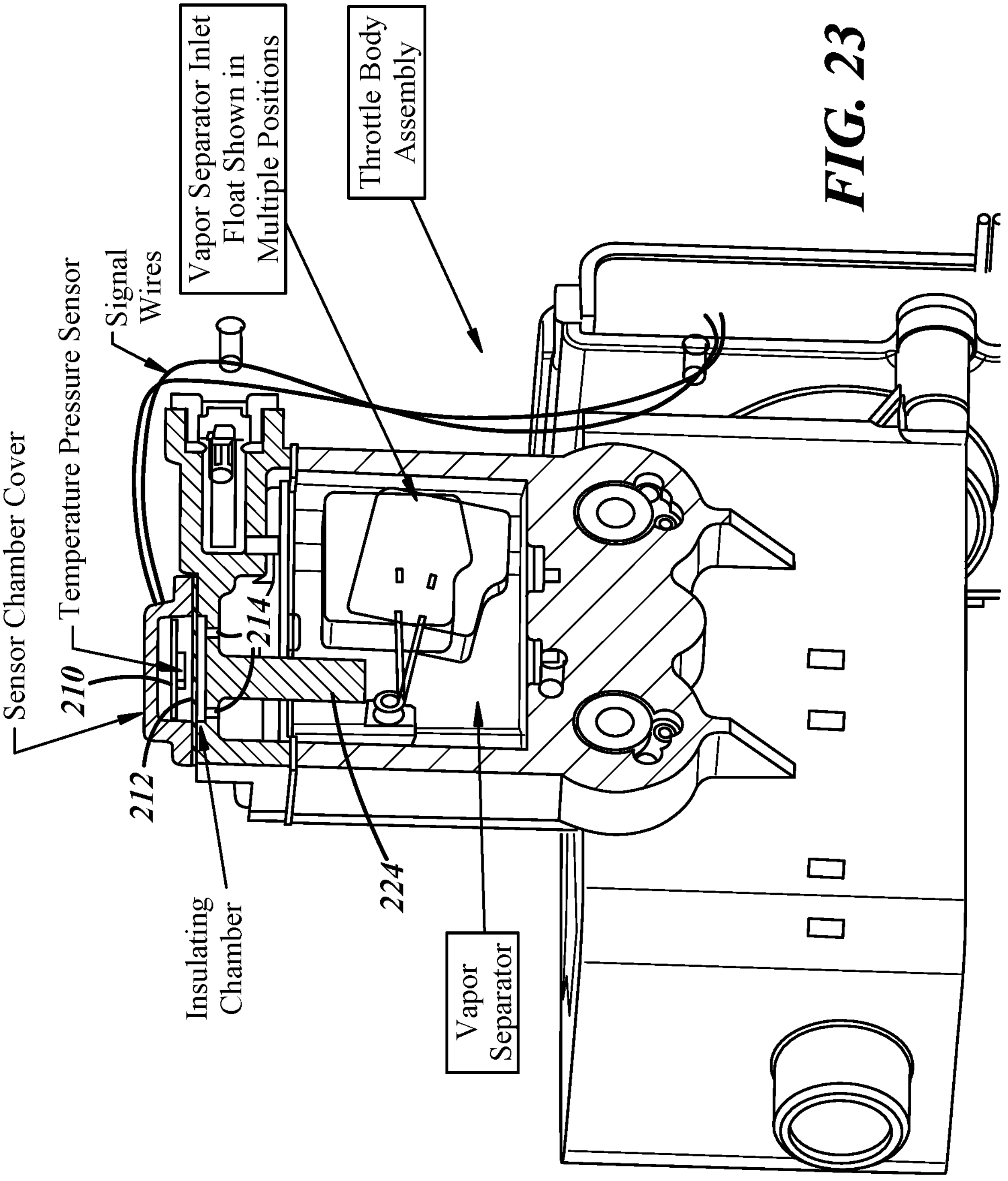
FIG. 23 is a partial sectional view of the main body and controller assembly showing pressure and temperature sensors of the controller assembly.

Another embodiment of a pressure sensor 210 is shown in FIG. 23 and includes an analog or digital pressure sensor mounted externally to the controller assembly housing 168 or main body 12, and may be communicated with the fuel chamber 72 for direct sensing of the vapor pressure resident in the fuel chamber 72. The pressure sensor 210 may include a diaphragm 212 or spring biased plunger that is communicated with the fuel chamber 72 via one or more ports 214, and that activates or closes a switch (e.g. set of contacts) on the opposite side of the diaphragm 212 when a threshold pressure exists in the fuel chamber 72. The resultant signal is provided to the controller 166 which can activate one or more vent valves to permit venting from the fuel chamber to reduce, increase or maintain the pressure, as desired.

As shown in FIG. 18, the controller assembly 158 may also include a temperature sensor 220, such as a Negative Temperature Coefficient sensor having a sensor bead 222 on a wire 223 in a hollow projection 224 of the housing 168 that is received in a passage or cavity 226 of the main body 12.

The temperature sensor 220 may be located closer to the inlet side of the main bore 16 to sense engine intake air temperature, or may be otherwise located as desired. The temperature sensor 220 may be incorporated into the pressure sensor shown in FIG. 23, if desired. That is the projection 224 containing the temperature sensor element 222 may be part of the housing 168 that carries the diaphragm 212 or plunger and the switch (e.g. sensor 210).

The forms of the invention herein disclosed constitute presently preferred embodiments and many other forms and embodiments are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A fuel supply device, comprising:

a main body having a main bore with an inlet through which air flows and an outlet through which a fuel and air mixture flows;

a fuel chamber in which a supply of fuel is received;

a vent passage that communicates with the fuel chamber and with a first port through which vapor is vented out of the main body, and a vent valve carried by the main body and arranged to control fluid flow through the first port, wherein the vent valve is electronically actuated to open and close a valve seat arranged in the vent passage.

2. The device of claim 1 which also includes a pressure relief valve that has a valve element and a spring that provides a force on the valve element tending to close the valve element on a valve seat, and wherein the pressure relief valve is communicated with the vent passage and permits a flow of vapor through the pressure relief valve when a pressure acting on the pressure relief valve is greater than a threshold pressure.

3. The device of claim 1 which also includes a second electronically actuated valve that is carried by the main body and arranged to permit fluid flow into the fuel supply device through a second port that is spaced from the first port.

4. The device of claim 1 wherein the vent valve is pulsed between open and closed positions to control a flow rate of vapor through the first port.

5. The device of claim 1 which also includes a controller communicated with the vent valve to control actuation of the vent valve, and a pressure sensor arranged to sense the pressure within the fuel chamber, and wherein the controller controls actuation of the vent valve as a function of the pressure within the fuel chamber.

6. The device of claim 5 wherein the vent valve is actuated to provide a controlled rate of depressurization of the fuel chamber.

7. The device of claim 1 wherein part of the vent passage is defined by an end of a snorkel tube extending from and coupled to the main body.

8. The device of claim 7 wherein a shroud is provided at the end of the snorkel tube and arranged to reduce pressure fluctuations at the end.

9. The device of claim 1 which includes a throttle valve having an idle position and a wide open position in which a greater flow rate of air is possible through the main bore than when the throttle valve is in the idle position, and wherein the vent passage is a first vent passage that communicates with the main bore upstream of the throttle valve when the throttle valve is in the idle position, and a second vent passage is provided that communicates with the main bore downstream of the throttle valve when the throttle valve is in the idle position.

10. The device of claim 5 wherein the pressure sensor includes a diaphragm or a spring biased plunger that is communicated with the fuel chamber via one or more ports, and wherein the diaphragm or spring biased plunger is moved to close a switch when a threshold pressure exists in the fuel chamber.

11. The device of claim 10 wherein the controller actuates the vent valve when the switch is closed.

12. A fuel supply device, comprising:

a main body having a main bore with an inlet through which air flows and an outlet through which a fuel and air mixture flows;

a fuel bowl connected to the main body and defining a fuel chamber in which a supply of fuel is received;

a column extending into the fuel chamber and defining a bore;

a fuel supply pipe received at least partly in the bore and having a passage communicating with the main bore between the inlet and the outlet, and through which fuel from the fuel chamber flows to the main bore; and a fuel valve connected to the fuel bowl and having a valve seat, a valve element movable relative to the valve seat between an open position and a closed position, and the fuel valve has an inlet that is upstream of the valve seat and is in communication with the fuel chamber, and the fuel valve has an outlet that is downstream of the valve seat, wherein the outlet is coaxially aligned with the passage of the fuel supply pipe and the fuel valve is electrically operated to move the valve element.

13. The device of claim 12 wherein the fuel bowl includes a cavity in which at least part of the fuel valve is received, and wherein a main jet is provided between the fuel valve and the fuel supply pipe, and the main jet includes a restriction having a flow area that is less than the flow area of the passage of the fuel supply pipe.

14. The device of claim 13 wherein the cavity is defined at least in part by a boss of the fuel bowl that extends into the fuel chamber, and wherein one or more inlets are formed in the boss and through which fuel from the fuel chamber can flow to the fuel valve.

15. The device of claim 12 wherein the fuel valve includes a bobbin having an internal passage and an exterior surface spaced from the internal passage, a wire coil wrapped around the exterior surface of the bobbin, a valve seat defined by the bobbin, an outlet of the fuel valve downstream of the valve seat and defined by the bobbin, and an armature received in the internal passage upstream of the valve seat and wherein the armature is movable relative to the valve seat to selectively permit fluid flow through the valve seat.

16. The device of claim 15 wherein the outlet is coaxially aligned with the passage of the fuel supply pipe.

17. The device of claim 15 wherein the fuel valve is received in a cavity defined at least in part by a boss of the fuel bowl that extends into the fuel chamber, one or more inlets are formed in the boss and through which fuel from the fuel chamber can flow to cavity, and wherein the bobbin includes one or more fluid inlets through which fuel flows from the one or more inlets formed in the boss to the internal passage upstream of the valve seat.

18. The device of claim 12 which also includes a vent passage that communicates with the fuel chamber, and a vent valve that controls fluid flow through the vent passage, wherein the vent valve is electronically actuated to open and close a valve seat arranged in the vent passage.

19. The device of claim 18 which also includes a controller connected to the fuel valve and the vent valve to control operation of both the fuel valve and the vent valve.

20. The device of claim 19 which includes a pressure sensor or a temperature sensor communicated with the controller and located to sense a pressure or temperature of a portion of a passage or fuel chamber of the main body, and wherein one or both of the fuel valve and the vent valve are controlled at least in part based upon the pressure or temperature.

* * * * *